US011375505B2

(12) United States Patent
Ioffe et al.

(10) Patent No.: US 11,375,505 B2
(45) Date of Patent: Jun. 28, 2022

(54) SYSTEMS AND METHODS FOR MULTI-STANDARD COMMUNICATION OVER FREQUENCY BAND

(71) Applicant: Apple Inc., Cupertino, CA (US)

(72) Inventors: Anatoliy Sergey Ioffe, Redwood City, CA (US); Alexander Sayenko, Munich (DE)

(73) Assignee: Apple Inc., Cupertino, CA (US)

( * ) Notice: Subject to any disclaimer, the term of this patent is extended or adjusted under 35 U.S.C. 154(b) by 154 days.

(21) Appl. No.: 16/920,488

(22) Filed: Jul. 3, 2020

(65) Prior Publication Data

US 2021/0144706 A1 May 13, 2021

Related U.S. Application Data

(60) Provisional application No. 62/932,793, filed on Nov. 8, 2019.

(51) Int. Cl.
*H04L 12/28* (2006.01)
*H04W 72/04* (2009.01)
*H04J 1/16* (2006.01)
*H04W 84/12* (2009.01)

(52) U.S. Cl.
CPC ........ *H04W 72/0453* (2013.01); *H04W 84/12* (2013.01)

(58) Field of Classification Search
CPC .. H04W 16/14; H04W 72/0453; H04W 92/20
USPC ................................. 370/252, 329, 430, 442
See application file for complete search history.

(56) References Cited

U.S. PATENT DOCUMENTS

| 2016/0157265 A1* | 6/2016 | Lee .................. H04W 72/0413 370/329 |
| 2019/0110208 A1 | 4/2019 | Xue et al. |
| 2019/0124694 A1 | 4/2019 | Kannan et al. |
| 2019/0200389 A1 | 6/2019 | Li et al. |

FOREIGN PATENT DOCUMENTS

| WO | 2017212456 A1 | 12/2017 |
| WO | 2019033971 A1 | 2/2019 |

* cited by examiner

*Primary Examiner* — John Pezzlo
(74) *Attorney, Agent, or Firm* — Fletcher Yoder PC

(57) ABSTRACT

Systems and methods are disclosed for coordinating transmission and reception of data according to multiple communication standards over a frequency band. In particular, one or more base stations/mobile electronic devices may determine a first data size of first data to be sent conforming to a first communication standard and a second data size of second data conforming to a second communication standard. A first time period may then be determined for which to send the first data based on the first data size, and a second time period may be determined for which to send the second data based on the second data size. In response to determining that the frequency channel is clear of other transmissions, the first data may be sent according to the first standard in the first time period, and the second data may be sent according to the second standard in the second time period.

20 Claims, 18 Drawing Sheets

SYSTEMS AND METHODS FOR MULTI-STANDARD COMMUNICATION OVER FREQUENCY BAND

CROSS REFERENCE TO RELATED APPLICATION

This application is a non-provisional application claiming priority to U.S. Provisional Application No. 62/932,793, entitled "SYSTEMS AND METHODS FOR MULTI-STANDARD COMMUNICATION OVER FREQUENCY BAND," filed Nov. 8, 2019, which is hereby incorporated by reference in its entirety for all purposes.

BACKGROUND

The present disclosure relates generally to wireless communication systems, and more particularly, to enabling wireless communications using multiple wireless communication standards over a frequency band.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Wireless communication systems are rapidly growing in usage. In recent years, wireless devices such as smartphones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Transmitters and/or receivers may be included in various electronic devices to enable communication between user equipment (e.g., user electronic devices, transmitting or receiving electronic devices) and core networks on said wireless networks, deployed through a variety of technologies including but not limited to access network base stations (e.g., network access nodes), such as an eNodeB (eNB) for long-term evolution (LTE) access networks and/or a next generation NodeB (gNB) for $5^{th}$ generation (5G) access networks. In some electronic devices, a transmitter and a receiver are combined to form a transceiver. Transceivers may transmit and/or receive wireless signals by way of an antenna coupled to the transceiver, such as radio frequency (RF) signals indicative of data.

By way of example, an electronic device may include a transceiver to transmit and/or receive the radio frequency signals over one or more frequencies of a wireless network. The transmitter may include a variety of circuitry, including, for example, processing circuitry to modulate a data signal onto a carrier wave to generate a radio frequency signal. The radio frequency signal's frequency may be within the range of designated frequency spectrums for standardized communication by mobile networks.

The information to be transmitted is typically modulated onto the radio frequency signal prior to wireless transmission. In other words, the information to be transmitted is typically embedded in an envelope of a carrier signal that has a frequency in the radio frequency range. To embed or extract the information in or from the envelope of the carrier signal, processing may be performed on a received radio frequency signal according to transmission parameters. For example, an electronic device (e.g., user equipment) may demodulate the radio frequency signal (e.g., to remove the carrier signal) to recover the embedded information in the envelope based on a frequency of the received radio frequency signal. Data modulation and demodulation may be performed according to one of many mobile communication standards. The standards organizations may design or specify parameters of the mobile communication networks, such as the third generation of broadband cellular network technology (3G), fourth generation of broadband cellular network technology (4G)—including the Long-Term Evolution standard (LTE), and fifth generation of broadband cellular network technology (5G)—including the New Radio standard (NR).

Each mobile network may perform data transmission and reception utilizing the allocated frequency spectrum. The frequency spectrum allocation changes between countries, but there is an international consensus to enable use of certain frequency bands (e.g., 5150-5924 megahertz (MHz), or approximately 5 gigahertz (GHz) band) without the need for an issued license. As such, these frequency bands may be referred to as "unlicensed spectrum" or "unlicensed frequency bands".

The ever increasing data sizes transmitted over networks, introduction of new mobile communication standards, such as, but not limited to, LTE and NR standards, combined with limited frequency spectrum resources, may benefit from mobile network spectrum expansion into unlicensed spectrum. In other words, the mobile networks, such as those operating under the LTE standard ("LTE networks") and those operating under the NR standard ("NR networks"), may utilize the unlicensed frequency spectrum in addition to their designated frequency spectrums, and they may be sharing the spectrum together and with other wireless network technologies such as Wi-Fi.

Multiple wireless networks operating on a frequency spectrum (e.g., the same frequency spectrum or overlapping frequency spectrums) may result in increased data collision on the frequency channel. The wireless networks may use distinct circuitry and/or network base station for data transmission, which may not be in coordination with each other. Uncoordinated data transmission over the frequency spectrum may lead different transmitters to broadcast data over the same frequency channel inside the shared frequency spectrum. This may lead to unwanted data collision, resulting in data loss and/or retransmission of data.

To prevent data from colliding, the wireless networks may perform a Listen Before Talk (LBT) procedure. The LBT procedure may cause a transmitter to listen to a desired frequency channel and return an indication as to whether the channel is already occupied with data transmission from other transmitters. If the frequency channel is occupied with data traffic, the LBT procedure may cause the transmitter to wait for a random period of time before restarting the LBT procedure. The random wait period may also be referred to as random back-off time. If the transmitter identifies that the channel is clear of other transmissions, the transmitter may exit the LBT procedure and initiate the transmission. The transmission window may be limited to a maximum time regulated by wireless standards organizations.

However, having wireless devices communicating using the LTE standard and the wireless devices communicating using the NR standard, as well as those communicating using the Wi-Fi standard, compete for transmission time on the same (e.g., unlicensed) frequency band may negatively impact overall communication system. That is, two transmitters may use LBT procedures at the same time on a clear channel, which may lead to data collision on the channel. Furthermore, the LBT procedures may assign inefficient random back-off times to transmitters when different network stations are not in coordination with each other.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to systems and methods for coordinating transmission and reception of data according to multiple communication standards over a frequency band. In particular, one or more base stations (e.g., network access nodes) or mobile electronic devices (e.g., user equipment) may determine a first data size of first data to be sent conforming to a first communication standard (e.g., the New Radio standard (NR)) and a second data size of second data conforming to a second communication standard (e.g., the Long-Term Evolution standard (LTE)). A first time period may then be determined for which to send the first data based on the first data size, and a second time period may be determined for which to send the second data based on the second data size. The one or more base stations/mobile electronic devices may perform a Listen Before Talk (LBT) procedure over a frequency channel to determine whether the frequency channel is clear of other transmissions. Once the frequency channel is clear, the one or more base stations/mobile electronic devices may send the first data according to the first communication standard at a first time based on the first determined time period, and send the second data according to the second communication standard at a second time based on the first time, the first determined time period, and/or the second determined time period. In this manner, additional LBT procedures performed to confirm that the frequency channel is clear before sending the second data, or data collisions between sending the first data and the second data may be avoided, decreasing communication latency and increasing communication speed.

Indeed, in a first embodiment, a system may include a first base station including transmission circuitry to send first data at a first peak data rate of at least one gigabit per second on a frequency channel. The first base station may also include a control unit that may determine a first data size of the first data, determine a first time period to send the first data based on the first data size, and receive a second time period to send second data from a second base station at a second peak data rate of at least 20 gigabits per second on the frequency channel. The control unit may further determine a first time to send the first data based on the first time period, determine a second time for the second base station to send the second data based on the first time period and the second time period, send an instruction to the second base station to send the second data on the frequency channel at the second time, and send the first data on the frequency channel at the first time using the first transmission circuitry in response to determining that the frequency channel is clear of other transmissions.

In another embodiment, a system may include a base station including transmission circuitry and a base station control unit. The transmission circuitry may send first data at a first peak data rate of less than 20 gigabits per second and second data at a second peak data rate of at least 20 gigabits per second on a frequency channel. The base station control unit may determine that the frequency channel is clear of other transmissions, determine size of the first data and size of the second data, determine a first time period to send the first data based on the size of the first data and a second time period to send the second data based on the size of the second data, instruct the transmission circuitry to send the first data in the first time period on the frequency channel, and instruct the transmission circuitry to send the second data in the second time period on the frequency channel.

In yet another embodiment, a communication device may include transmission circuitry and a control unit. The transmission circuitry may send first data at a first peak data rate of less than one gigabit per second and second data at a second peak data rate of at least 20 gigabits per second on a range of frequencies. The control unit may determine size of the first data and size of the second data, determine a first transmission time interval to send the first data based on the size of the first data and a second transmission time interval to send the second data based on the size of the second data, determine that the range of frequencies is clear of other transmissions for a listening time interval, and instruct the transmission circuitry to send the first data in the first transmission time interval at the first peak data rate and the second data in the second transmission time interval at the second peak data rate on the range of frequencies.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
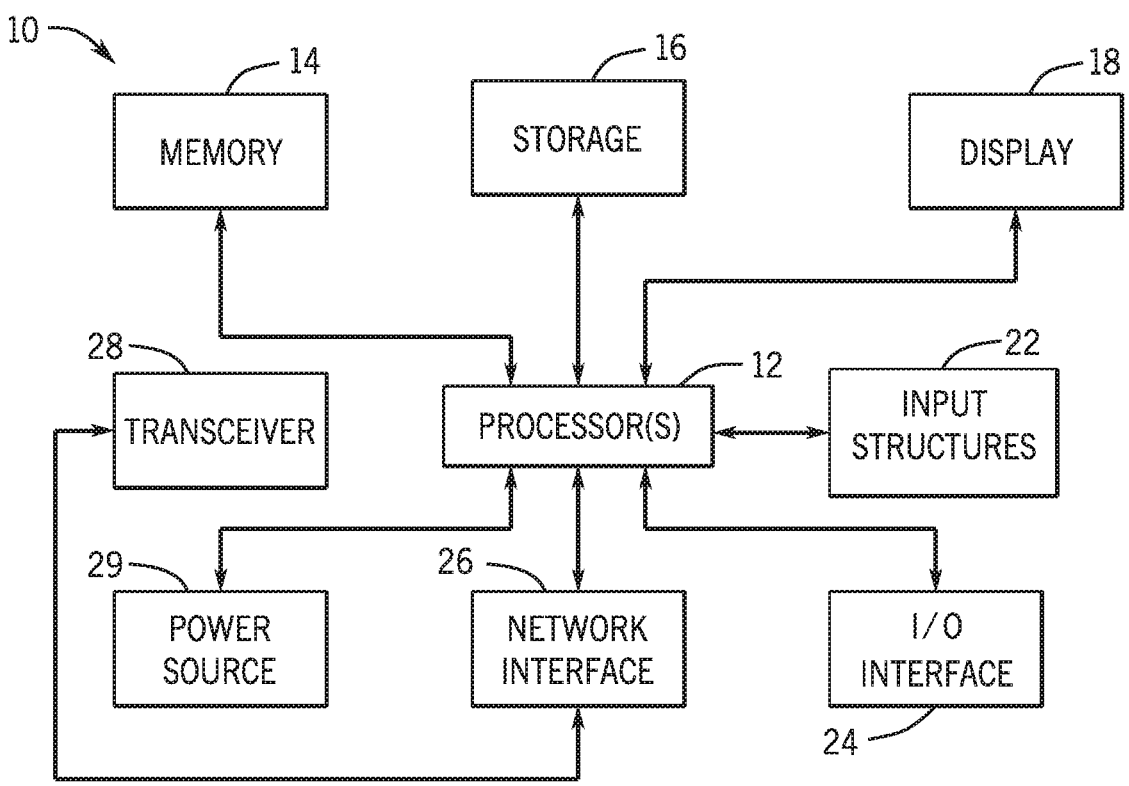
FIG. 1 is a schematic block diagram of an electronic device including a transceiver, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Various hardware modules and processes may transmit or facilitate transmission of data, modulated using different network communication standards (e.g., NR, LTE, Wi-Fi) and coordinated between one or multiple network transmission stations. The multi-standard communication systems described hereafter may include electronic devices (e.g., mobile electronic wireless communication devices or user equipment), network base stations (e.g., eNB and gNB), and/or any other suitable wireless communication hardware. Some processes may use coordination between network base stations to facilitate the multi-standard communication coordination.

Various processes are disclosed that may adjust operation of user equipment (e.g., electronic devices) and/or the base stations (e.g., network access nodes). The processes may apply to a variety of electronic devices. In some embodiments, a control system (e.g., a controller) of an electronic device may couple or uncouple a power amplifier to or from an antenna, a transmission path (e.g., a transmission channel) associated with the antenna, and/or a receive path (e.g., a receive channel) associated with the antenna, to change whether the antenna is able to transmit or receive signals. It is noted that a channel may be a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions). For example, long-term evolution (LTE) networks may support scalable channel bandwidths from 1.4 Megahertz (MHz) to 20 MHz. In contrast, wireless local area network (WLAN)

channels may be 22 MHz wide while BLUETOOTH® channels may be 1 MHz wide. Other protocols and standards may include different definitions of channels. Furthermore, some standards may define and use multiple types of channels, such as different channels for uplink or downlink and/or different channels for different uses such as data, control information, or the like. Also, as used herein, the term "band" has the full breadth of its ordinary meaning, and at least includes a section of spectrum (e.g., radio frequency spectrum) in which channels are used or set aside for the same purpose. These processes may be combined to bring certain advantages to operation, as is described herein. With the foregoing in mind, a general description of suitable electronic devices that may include such a transceiver is provided below.

Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, a transceiver 28, and a power source 29. The various functional blocks shown in FIG. 1 may include hardware elements (including circuitry), software elements (including computer code stored on a computer-readable medium) or a combination of both hardware and software elements. Furthermore, a combination of elements may be included in tangible, non-transitory, and machine-readable medium that include machine-readable instructions. The instructions may be executed by one or more processors and may cause the one or more processors to perform operations as described herein. It should be noted that FIG. 1 is merely one example of a particular embodiment and is intended to illustrate the types of elements that may be present in the electronic device 10.

Figure 2:
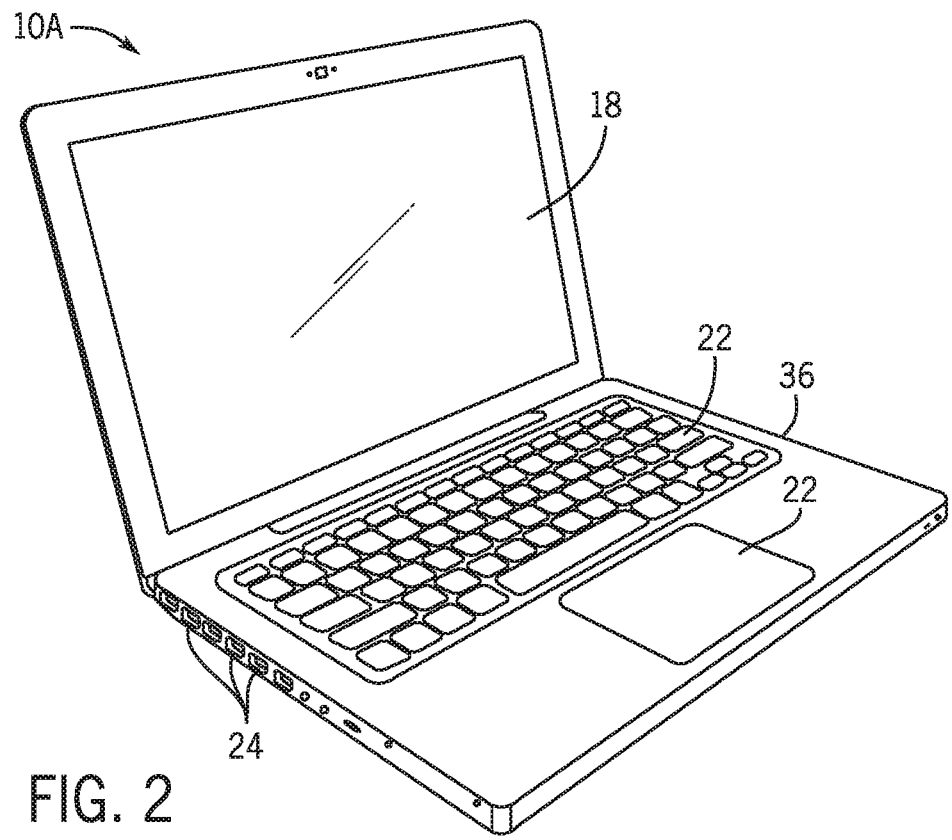
FIG. 2 is a front view of a handheld device representing an example of the electronic device of FIG. 1, in accordance with an embodiment.
Figure 4:
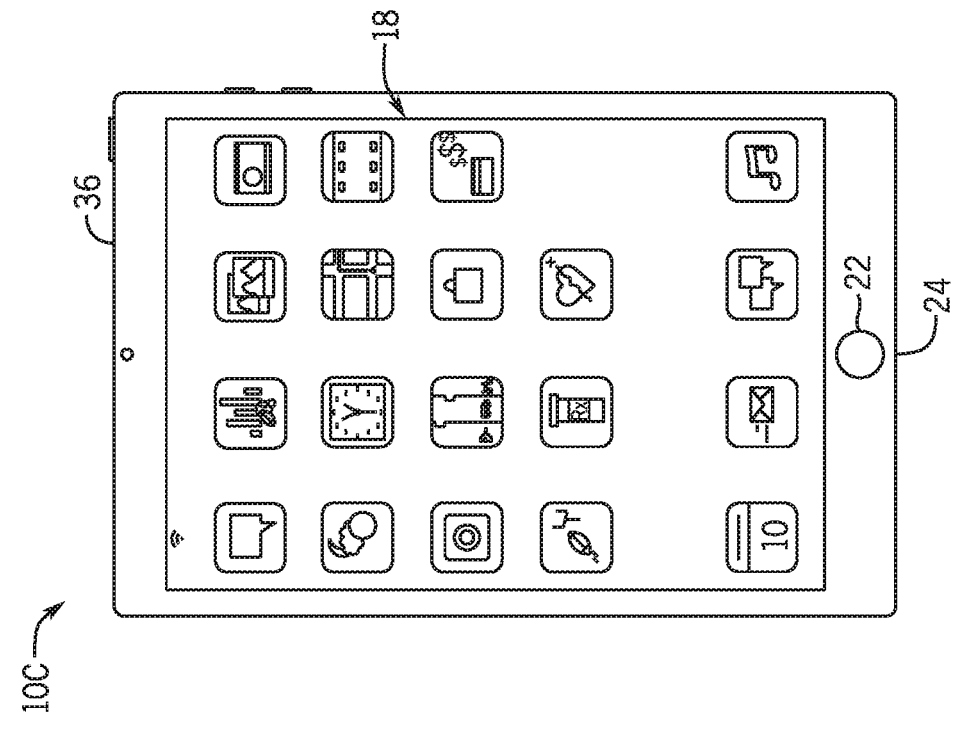
FIG. 4 is a front view and a side view of a wearable electronic device representing another example of the electronic device of FIG. 1, in accordance with an embodiment.
Figure 3:
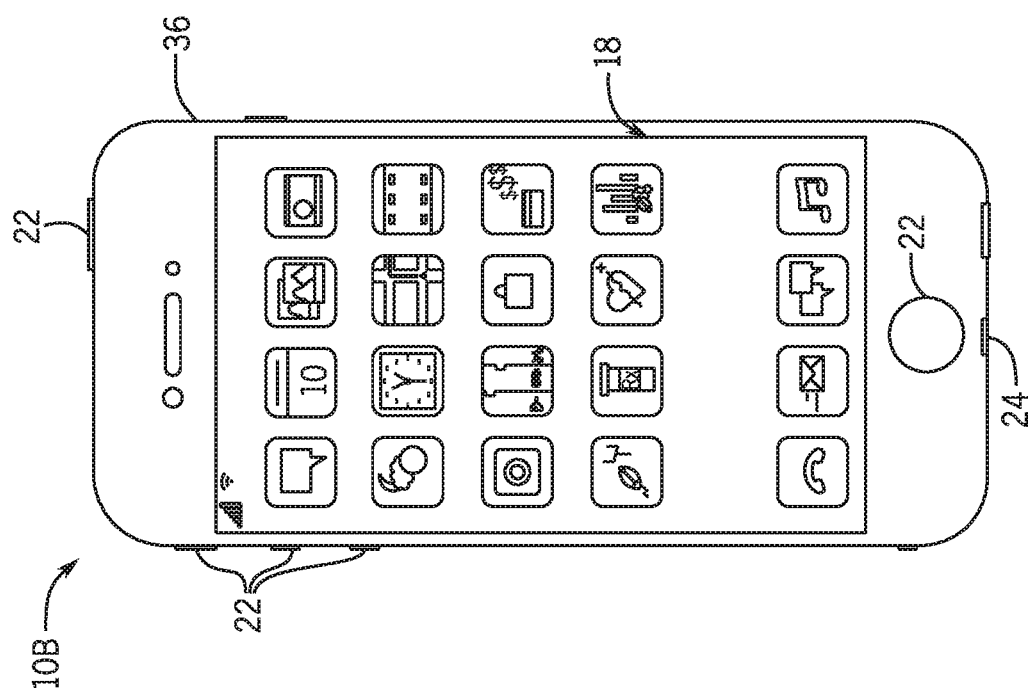
FIG. 3 is a front view of a handheld tablet device representing another example of the electronic device of FIG. 1, in accordance with an embodiment.
Figure 5:
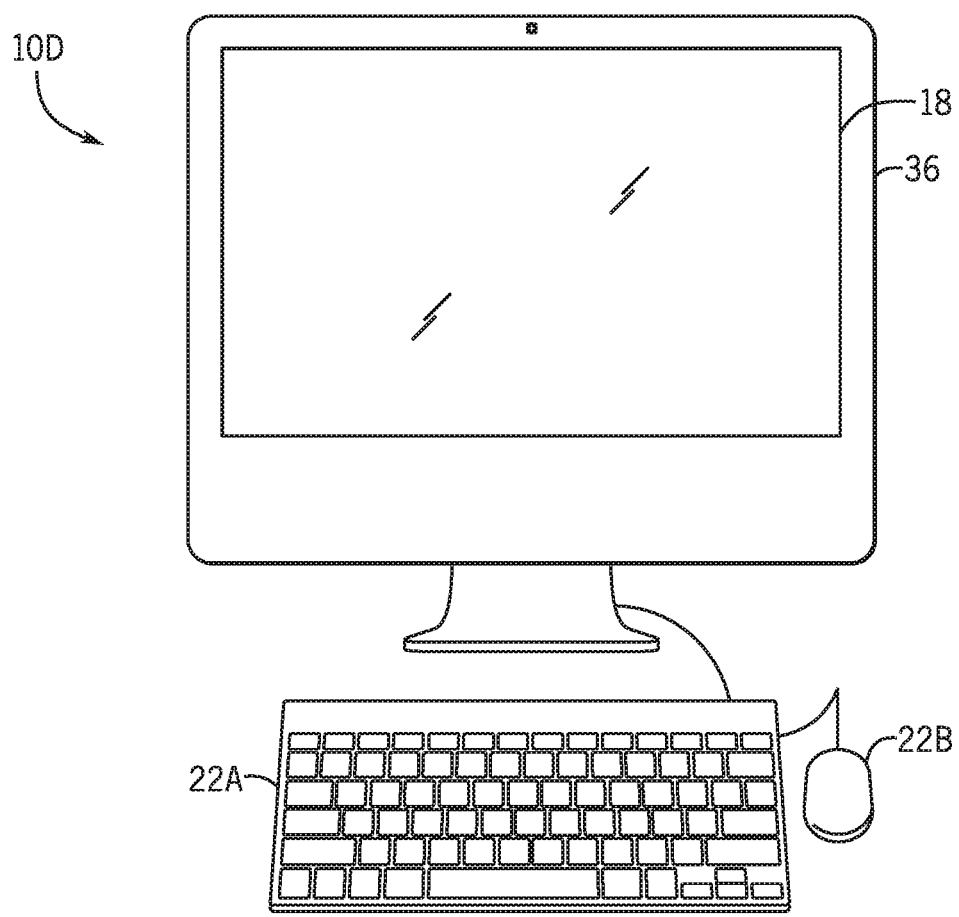
FIG. 5 is a front view of a desktop computer representing a fourth embodiment of the electronic device of FIG. 1.
Figure 6:
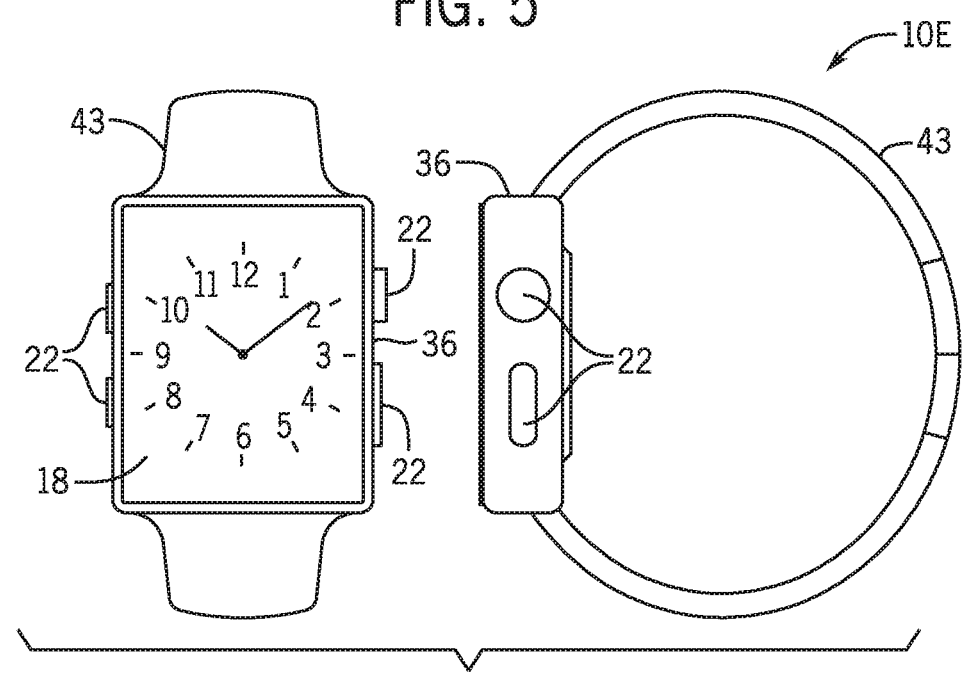
FIG. 6 is a front view and side view of a wearable electronic device representing a fifth embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 may operably couple with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or processes, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions executable by the processor(s) 12 to enable the electronic device 10 to provide various functionalities.

In certain embodiments, the display 18 may be a liquid crystal display (LCD), which may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable the electronic device 10 to interface with various other electronic devices, as may the network interface 26. The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a 3rd generation (3G) cellular network, 4th generation (4G) cellular network, long term evolution (LTE) cellular network, long term evolution license assisted access (LTE-LAA) cellular network, or 5th generation (5G) cellular network. The network interface 26 may also include one or more interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-wideband (UWB), alternating current (AC) power lines, and so forth.

In some embodiments, the electronic device 10 communicates over the aforementioned wireless networks (e.g., Wi-Fi, WiMAX, mobile WiMAX, 4G, LTE, 5G, and so forth) using the transceiver 28. The transceiver 28 may include circuitry useful in both wirelessly receiving and wirelessly transmitting signals (e.g., data signals, wireless data signals, wireless carrier signals, radio frequency signals), such as a transmitter and/or a receiver. Indeed, in some embodiments, the transceiver 28 may include a transmitter and a receiver combined into a single unit, or, in other embodiments, the transceiver 28 may include a transmitter separate from a receiver. The transceiver 28 may transmit and receive radio frequency signals to support voice and/or data communication in wireless applications such as, for example, PAN networks (e.g., Bluetooth), WLAN networks (e.g., 802.11x Wi-Fi), WAN networks (e.g., 3G, 4G, 5G, and LTE and LTE-LAA cellular networks), WiMAX networks, mobile WiMAX networks, ADSL and VDSL networks, DVB-T and DVB-H networks, UWB networks, and so forth. As further illustrated, the electronic device 10 may include the power source 29. The power source 29 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may be generally portable (such as laptop, notebook, and tablet computers) and/or those that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. of Cupertino, Calif. By way of example, the electronic device 10, taking the form of a notebook computer 10A, is illustrated in FIG. 2 in accordance with one embodiment of the present disclosure. The notebook computer 10A may include a housing or the enclosure 36, the display 18, the input structures 22, and ports associated with the I/O interface 24. In one embodiment, the input structures 22 (such as a keyboard and/or touchpad) may enable interaction with the notebook computer 10A, such as starting, controlling, or operating a graphical user interface (GUI) and/or applications running on the notebook computer 10A. For example, a keyboard and/or touchpad may facilitate user interaction with a user interface, GUI, and/or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include the enclosure 36 to protect interior elements from physical damage and to shield them from electromagnetic interference. The enclosure 36 may surround the display 18. The I/O interface 24 may open through the enclosure 36 and may include, for example, an I/O port for a hard wired connection for charging and/or content manipulation using a standard connector and protocol, such as the Lightning connector provided by Apple Inc. of Cupertino, Calif., a universal serial bus (USB), or other similar connector and protocol.

The input structures 22, in combination with the display 18, may enable user control of the handheld device 10B. For example, the input structures 22 may activate or deactivate the handheld device 10B, navigate a user interface to a home screen, present a user-editable application screen, and/or activate a voice-recognition feature of the handheld device 10B. Other of the input structures 22 may provide volume control, or may toggle between vibrate and ring modes. The input structures 22 may also include a microphone to obtain a user's voice for various voice-related features, and a speaker to enable audio playback. The input structures 22 may also include a headphone input to enable input from external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. of Cupertino, Calif. It should be noted that the computer 10D may also represent a personal computer (PC) by another manufacturer. The enclosure 36 may protect and enclose internal elements of the computer 10D, such as the display 18. In certain embodiments, a user of the computer 10D may interact with the computer 10D using various peripheral input devices, such as keyboard 22A or mouse 22B (e.g., input structures 22), which may operatively couple to the computer 10D.

Similarly, FIG. 6 depicts a wearable electronic device 10E representing another embodiment of the electronic device 10 of FIG. 1. By way of example, the wearable electronic device 10E, which may include a wristband 43, may be an Apple Watch® by Apple Inc. of Cupertino, Calif. However, in other embodiments, the wearable electronic device 10E may include any wearable electronic device such as, a wearable exercise monitoring device (e.g., pedometer, accelerometer, heart rate monitor), or other device by another manufacturer. The display 18 of the wearable electronic device 10E may include a touch screen version of the display 18 (e.g., LCD, OLED display, active-matrix organic light emitting diode (AMOLED) display, and so forth), as well as the input structures 22, which may facilitate user interaction with a user interface of the wearable electronic device 10E.

The electronic device 10 may communicate with a communication network provided by one or more base stations using the transceiver 28 by sending and receiving signals that conform to a communication standard, such as LTE, NR, or Wi-Fi. The LTE standard specifies a nominal data rate of 100 megabits per second (Mbit/s) while the electronic device 10 physically moves at high speeds relative to the one or more base stations, and one gigabit per second (Gbit/s) while the electronic device 10 and the one or more base stations are in relatively fixed positions. The NR standard specifies a downlink peak data rate of 20 Gbit/s and an uplink peak data rate of 10 Gbit/s. The Wi-Fi standard specifies a peak data rate of one Gbit/s. While each standard may be associated with a different, designated frequency spectrum, in some cases, data may be sent according to multiple standards that share a frequency spectrum, such as the "unlicensed spectrum" of 5150-5924 MHz, or approximately 5 GHz band. A benefit may include greater overall flexibility, bandwidth, or bitrate, by having data conforming to a communication standard use not only its designated frequency spectrum to send and receive data, but also use the unlicensed spectrum. However, without proper coordination, multiple wireless networks operating using multiple communication standards on the unlicensed frequency spectrum may result in increased data collision on the unlicensed frequency channel. The systems and methods described in this disclosure provide coordination between base stations and/or electronic devices 10 using multiple, different communication standards operating on the unlicensed spectrum to avoid or reduce data collision, increasing throughput and speed of communication.

Figure 7:
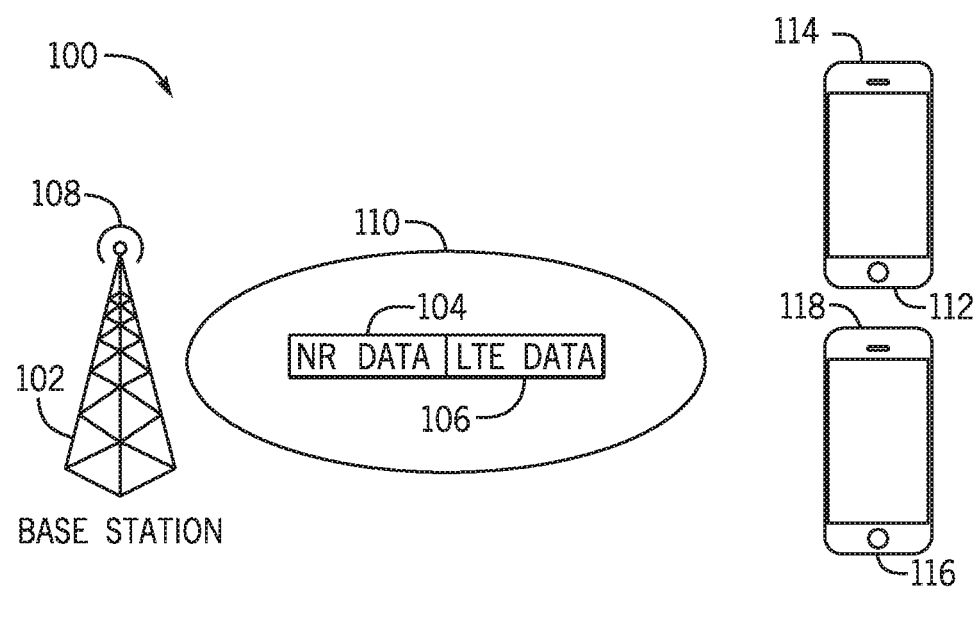
FIG. 7 is a diagram depicting a communication system having a network base station that coordinates data transmission and/or reception using multiple network communication standards over a frequency channel, according to embodiments of the present disclosure.

Coordinating Transmission Using Multiple Communication Standards from a Base Station Over a Frequency Channel FIG. 7 is a diagram depicting a communication system 100 that includes access network nodes, such as network base station 102 that coordinates data transmission and/or reception using multiple network communication standards over a frequency channel, according to embodiments of the present disclosure. The network base station 102 may transmit first data according to the NR standard (e.g., NR data 104), and second data using the LTE standard (e.g., LTE data 106), via an antenna 108 or an array of antennas 108, over a frequency band or channel of, for example, the unlicensed spectrum. In particular, the network base station 102 may modulate the NR data 104 on a carrier signal 110 according to the NR standard, and modulate the LTE data 106 on the carrier signal 110 according to the LTE standard. In other words, the NR data 104 and the LTE data 106 may be embedded in an envelope of the carrier signal 110 having a frequency in the radio frequency range (e.g., in the unlicensed spectrum). As such, the base station 102 may be a Next Generation Node B (gNB) base station that supports fifth generation broadband cellular network technology (5G), including the NR standard, an Evolved Node B (eNB)

base station that supports fourth generation broadband cellular network technology (4G), including the LTE standard.

Figure 9:
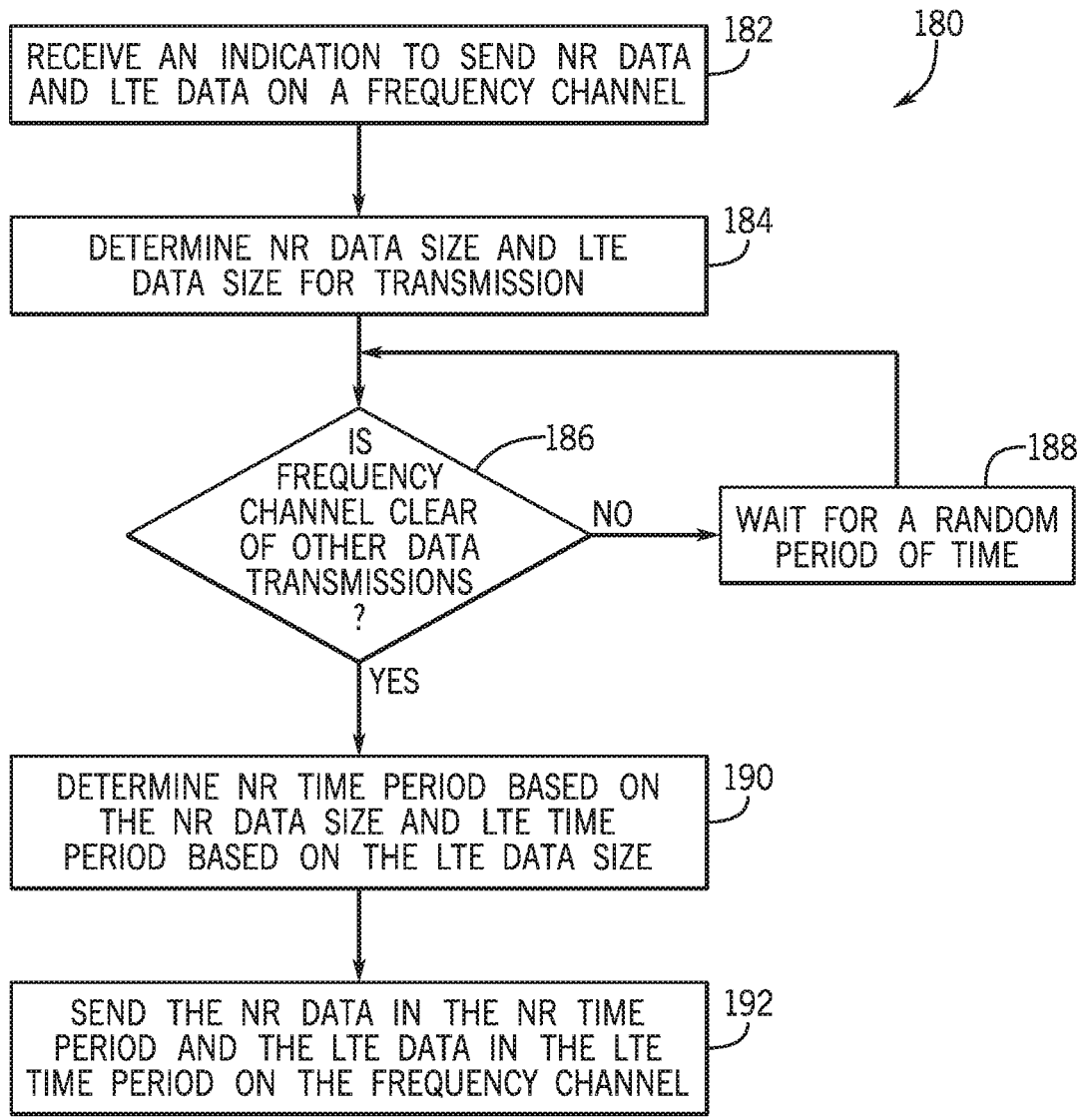
FIG. 9 is a flowchart illustrating a method for coordinating data transmission from the network base station of FIG. 7 using multiple network communication standards over a frequency channel, according to embodiments of the present disclosure.
Figure 10:
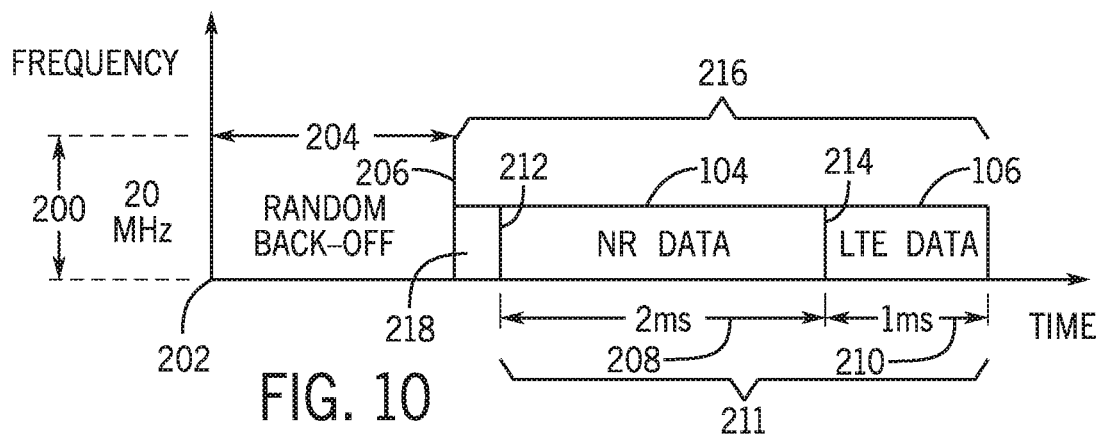
FIG. 10 is a timing diagram of the network base station of FIG. 7 coordinating data transmission using multiple network communication standards over a frequency channel, according to embodiments of the present disclosure.

To enable coordination between sending the NR data 104 and the LTE data 106, the base station 102 may determine sizes of the NR data 104 and the LTE data 106, determine time periods for which to send the respective data, perform a Listen Before Talk (LBT) procedure over the frequency channel to determine whether the frequency channel is clear of other transmissions, and, if the frequency channel is clear, send the NR data 104 at a first time and the LTE data 106 at a second time based on the determined time periods, as described in further detail below with respect to FIGS. 9 and 10. In this manner, additional LBT procedures performed to confirm that the frequency channel is clear before sending, for example, the LTE data 106, or data collisions between sending the NR data 104 and the LTE data 106, may be avoided, decreasing communication latency and increasing communication speed. It should be understood that the network base station 102 may transmit the NR data 104 and the LTE data 106 using any suitable different communication standards, including, for example Wi-Fi.

A first electronic device 112 (e.g., a first user equipment) having a receiver capable of extracting data conforming to the NR standard may receive the carrier signal 110 via one or more antennas 114 of the first electronic device 112 and demodulate the carrier signal 110 to extract the NR data 104. Similarly, a second electronic device 116 having a receiver capable of extracting data conforming to the LTE standard may receive the carrier signal 110 via one or more antennas 118 of the second electronic device 116 and demodulate the carrier signal 110 to extract the LTE data 106. The first and second electronic devices 112, 116 may each be in the form of the electronic device 10 as described in FIGS. 1-6 above. In some embodiments, a single electronic device (e.g., 112) having a receiver capable of extracting data conforming to the NR standard and a receiver capable of extracting data conforming to the LTE standard (or a receiver capable of extracting data conforming to both the NR and the LTE standards) may receive the carrier signal 110 and extract both the NR data 104 and the LTE data 106. Thus, such an electronic device may receive both the NR data 104 and the LTE data 106 in a virtually parallel fashion via both the NR and the LTE standards.

It is noted that user equipment able to communicate with the access nodes may include any of various types of computer systems device which are mobile or portable and which performs wireless communications. Examples of user equipment any suitable portable electronic devices, mobile telephones, smart phones, portable gaming devices, laptops, wearable devices, or the like. In general, the term "UE" or "UE device" can be broadly defined to encompass any electronic, computing, and/or telecommunications device (or combination of devices) which is easily transported by a user and capable of wireless communication.

The term "base station" has the full breadth of its ordinary meaning, and at least includes a wireless communication station installed at a fixed location and used to communicate as part of a wireless telephone system or radio system. The base stations 102, the first electronic device 112, and the second electronic device 116 may be configured to communicate over the transmission medium using any of various radio access technologies (RATs), also referred to as wireless communication technologies, or telecommunication standards, such as Global System for Mobile Communications (GSM), Universal Mobile Telecommunications Service (UMTS) (e.g., associated with wide-band Code-Division Multiple Access (WCDMA) or time division (TD) short-band Code-Division Multiple Access (SCDMA) air interfaces), LTE, LTE-Advanced (LTE-A), 5G New Radio (5G NR), High Speed Packet Access (HSPA), 3GPP2 CDMA2000 (e.g., real-time text (1×RTT), Evolution-Data Optimized (1×EV-DO), High Rate Packet Data (HRPD), evolved HRPD (eHRPD)), or the like. Note that if a respective base station, such as the base station 102 is implemented in the context of LTE, it may alternately be referred to as an "eNodeB" or "eNB". Note that if a respective base station is implemented in the context of 5G NR, it may alternately be referred to as "gNodeB" or "gNB".

Thus, while base stations 102 may act as a "serving cell" for electronic devices as illustrated in FIG. 7, an electronic device 10 may also be capable of receiving signals from (and possibly within communication range of) one or more other cells (which might be provided by base station 102 and/or any other base stations), which may be referred to as "neighboring cells". Such cells may also be capable of facilitating communication between user devices and/or between user devices and the network. Such cells may include "macro" cells, "micro" cells, "pico" cells, and/or cells which provide any of various other granularities of service area size.

Figure 8:
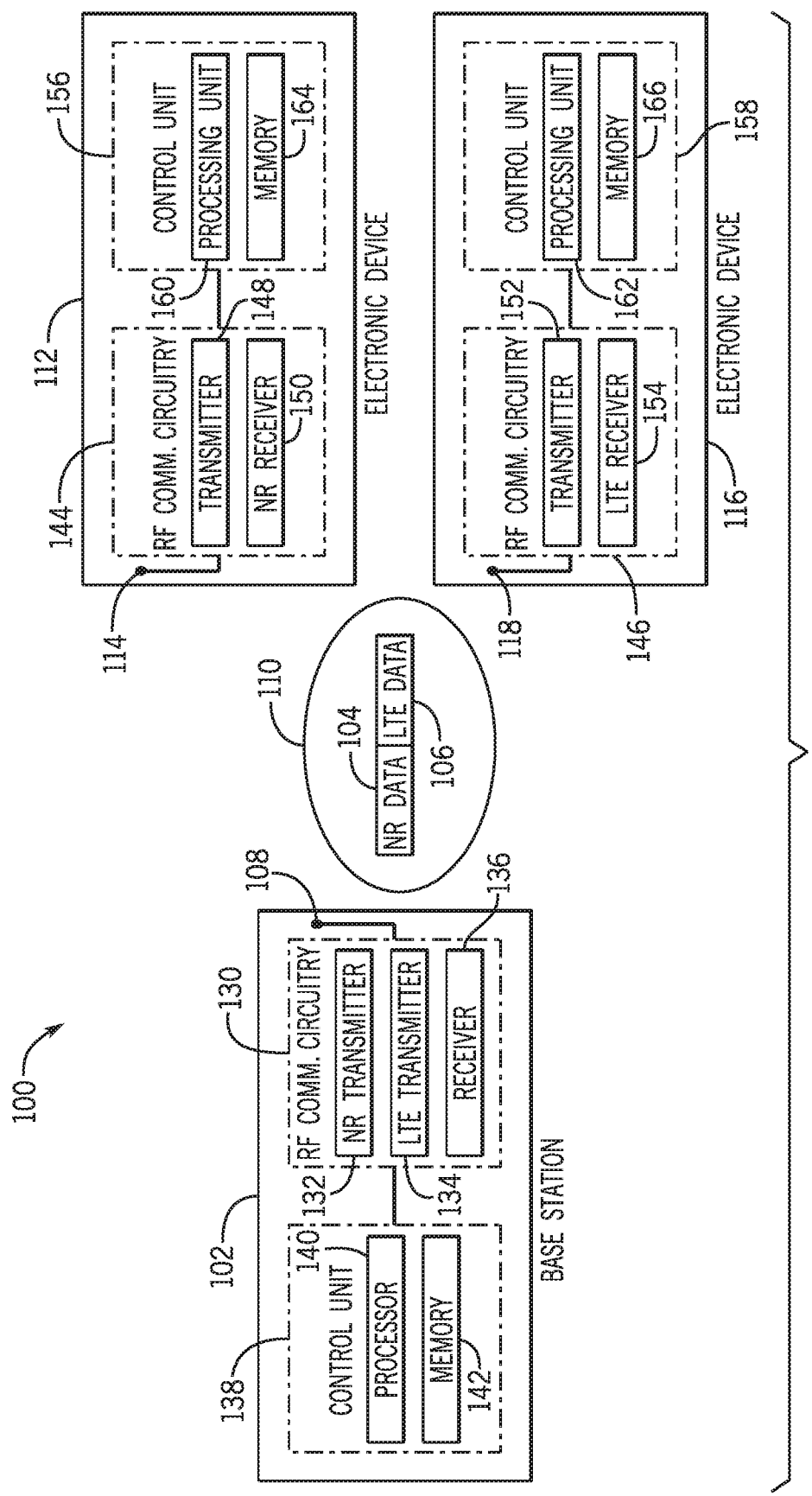
FIG. 8 is a block diagram of the communication system of FIG. 7, according to embodiments of the present disclosure.

FIG. 8 is a block diagram of the communication system 100 of FIG. 7, according to embodiments of the present disclosure. As illustrated, the network base station 102 includes radio frequency communication circuitry 130 having a first transmitter that sends data according to the NR standard (an NR transmitter 132), a second transmitter that sends data according to the LTE standard (an LTE transmitter 134), and a receiver 136 that receives data, via the one or more antennas 108. In some embodiments, the transmitters 132, 134 may be combined as a single transmitter. As such, the NR transmitter 132 and LTE transmitter 134 may be considered as "co-located" at the base station 102. Moreover, in additional or alternative embodiments, at least one of the transmitters 132, 134 and the receiver 136 may be combined as a transceiver.

The transmitters 132, 134 and/or the receiver 136 may be driven by control unit 138 to embed the NR data 104 and/or the LTE data 106 onto or extract data from the carrier signal 110. In particular, the control unit 138 may cause the NR transmitter 132 to modulate the NR data 104 onto a carrier wave to generate the radio frequency carrier signal 110. Similarly, the control unit 138 may cause the LTE transmitter 134 to modulate the LTE data 106 onto the carrier wave to generate the radio frequency carrier signal 110. The transmitters 132, 134 may include any suitable circuitry to facilitate transmitting data, including, for example, processing circuitry for signal modulation. The transmitters 132 and 134 may also or alternatively include power circuitry, such as a power amplifier (e.g., amplifying circuitry), to increase a power level of the carrier signal 110 so that the transmitters 132 and 134 may effectively transmit the carrier signal 110 into the air via the antenna 108.

The receiver 136 may demodulate a received carrier signal for the control unit 138 to analyze or process data in the received carrier signal. The receiver 136 may include any suitable circuitry to facilitate receiving data, including, for example, processing circuitry to demodulate the received carrier signal. The receiver 136 may also include power circuitry to increase or decrease a power level of the received carrier signal to better extract the data and/or facilitate analyzing and/or processing by the control unit 138.

The control unit 138 may generate control signals to control incoming and outgoing communications, and may include a processor 140 and a memory 142. The processor 140 may include any suitable processing circuitry, such as one or more processors, microprocessors, general-purpose processors, special-purpose processors, application specific integrated circuits, reduced instruction set (RISC) processors, or some combination thereof. The memory 142 may store information such as control software, look up tables, configuration data, etc. In some embodiments, the processor 140 and/or the memory 142 may be external to the control unit 138 and/or the radio frequency communication circuit 130. The memory 142 may include a tangible, non-transitory, machine-readable-medium, such as a volatile memory (e.g., a random access memory (RAM)) and/or a nonvolatile memory (e.g., a read-only memory (ROM)). The memory 142 may store a variety of information and may be used for various purposes. For example, the memory 142 may store machine-readable and/or processor-executable instructions (e.g., firmware or software) for the processor 140 to execute, such as instructions for operating the radio frequency communication circuitry 130 to coordinate data transmission using multiple network communication standards over a frequency channel. The memory 142 may include one or more storage devices (e.g., nonvolatile storage devices) that may include read-only memory (ROM), flash memory, a hard drive, or any other suitable optical, magnetic, or solid-state storage medium, or a combination thereof.

The electronic devices 112, 116 also each includes respective radio frequency communication circuitry 144, 146. The radio frequency communication circuitry 144 of the first electronic device 112 includes a transmitter 148 and a receiver capable of extracting data conforming to the NR standard (an NR receiver 150), via the one or more antennas 114. Similarly, the radio frequency communication circuitry 146 of the second electronic device 116 includes a transmitter 152 and a receiver capable of extracting data conforming to the LTE standard (an LTE receiver 154), via the one or more antennas 118. In some embodiments, the transmitters 148, 152 may be combined with the respective receivers 150, 154 as a transceiver.

The electronic device 112 may include a control unit 156 that drives the transmitter 148 and/or the NR receiver 150 to embed data onto or extract data from a carrier signal (e.g., the carrier signal 110). In particular, the control unit 138 may cause the NR receiver 150 to extract the NR data 104 from the carrier signal 110. Similarly, the electronic device 116 may include a control unit 158 that drives the transmitter 152 and/or the LTE receiver 154 to embed data onto or extract data from a carrier signal (e.g., the carrier signal 110). In particular, the control unit 158 may cause the LTE receiver 154 to extract the LTE data 106 from the carrier signal 110. The transmitters 148, 152 may include any suitable circuitry to facilitate transmitting data, and the receivers 150, 154, may include any suitable circuitry to facilitate receiving data. As with the control unit 138 of the base station 102, the control units 156, 158 may generate control signals to control incoming and outgoing communications, and may include respective processors 160, 162 and respective memories 164, 166, which may be structurally similar and perform similar functions as the processor 140 and the memory 142 of the control unit 138 of the base station 102 described above.

The frequency channel may be determined by any suitable source among the base station 102 and the electronic devices 112, 116. That is, at least one of the base station 102 and the electronic devices 112, 116 may determine a desired frequency channel based on availability of the frequency channel in the unlicensed spectrum, user settings, availability of communication resources, hardware capabilities, compatibility, and so on. An indication of the desired frequency channel may then be sent to the other devices among the base station 102 and the electronic devices 112, 116. It should be understood that the network base station 102 and/or the electronic devices 112, 116 may include additional or alternative components that facilitate coordinated data transmission (e.g., between multiple base stations 101 and/or between multiple electronic devices 112, 116), such as mobile communication network access points, routers, and so on.

FIG. 9 is a flowchart illustrating a method 180 for coordinating data transmission from the network base station 102 using multiple network communication standards over a frequency channel, according to embodiments of the present disclosure. The method 180 may be performed by any suitable device that controls components of the network base station 102 of FIGS. 7 and 8, such as the control unit 138, the processor 140, and so on. While the method 180 is described using steps in a specific sequence, it should be understood that the present disclosure contemplates that the described steps may be performed in different sequences than the sequence illustrated, and certain described steps may be skipped or not performed altogether. In some embodiments, the method 180 may be implemented by executing instructions stored in a tangible, non-transitory, computer-readable medium, such as the memory 142, using a processor, such as the processor 140.

As illustrated, in process block 182, the processor 140 receives an indication to send NR data 104 and LTE data 106. The indication may be provided by separate or combined sources (e.g., other electronic device(s)) that send the NR data 104 and LTE data 106 to the base station 102, intending for the first electronic device 112 to receive the NR data 104 and the second electronic device 116 to receive the LTE data 106. In some embodiments, at least one of the base station and the electronic devices 112, 116 may indicate a preferred frequency channel, or frequency range, based on their respective radio frequency capabilities, among other things. The preferred frequency channel or frequency range may be part of a frequency spectrum that both NR data and LTE data may be sent on, such as the unlicensed spectrum. As such, the base station 102 may send the NR data 104 and LTE data 106 on the same frequency channel.

As an illustrative example, FIG. 10 is a timing diagram of the network base station 102 coordinating data transmission using multiple network communication standards over a frequency channel 200, according to embodiments of the present disclosure. As illustrated, the frequency channel 200 in the unlicensed spectrum has a channel width of 20 MHz, though any suitable channel width is contemplated.

Turning back to FIG. 9, in process block 184, the processor 140 determines the size of the NR data 104 (the NR data size) and the size of the LTE data 106 (the LTE data size) for transmission. In decision block 186, the processor 140 determines whether the frequency channel 200 is clear of other transmissions. That is, the processor 140 may use the radio frequency communication circuitry 130 and the antenna 108 to determine whether there is any data being transmitted on the frequency channel 200. In the illustrative example of FIG. 10, at time 202, the processor 140 determines if (e.g., by "listening" to) the frequency channel 200 is clear of other transmissions. This may also be referred to as "channel sensing".

Turning back to FIG. 9, if the frequency channel 200 is not clear of other transmissions, then in process block 188, the processor 140 waits for a random period of time before repeating decision block 186. In particular, the processor 140 may determine the random period of time (also referred to as a "random back-off time") that the base station 102 should wait before attempting transmission on the frequency channel 200, as the frequency channel 200 is currently being used. In the illustrative example of FIG. 10, the processor 140 waits for the random back-off time 204 to determine if the frequency channel 200 is clear of other transmissions. Once the random back-off time 204 has elapsed, the processor 140 repeats decision block 186 by determining whether the frequency channel 200 is clear of other transmissions at time 206. Decision block 186 and process block 188 may be referred to as the Listen Before Talk (LBT) procedure, as the processor 140 "listens" to the frequency channel 200 before sending data ("talking") on the frequency channel 200.

Turning back to FIG. 9, once the processor 140 has determined that the frequency channel 200 is clear of other transmissions, then in process block 190, the processor 140 determines a time period to send the NR data 104 (an NR time period) based on the NR data size and determines a time period to send the LTE data 106 (an LTE time period) based on the LTE data size. For example, the processor 140 may determine the NR time period such that it is sufficient to send the NR data size, and determine the LTE time period such that it is sufficient to send the LTE data size. In some embodiments, the time periods may be predetermined (e.g., one millisecond (ms), two ms, or any other suitable time periods), and the processor 140 may send portions of the NR data 104 and/or the LTE data 106 (e.g., set the NR data size and/or the LTE data size) such that the portions of the NR data 104 and/or the LTE data 106 may be sent in the time periods. In the illustrative example of FIG. 10, the processor 140 determines that the NR time period 208 is two ms and the LTE time period 210 is one ms. In some embodiments, the base station 102 may occupy the frequency channel 200 for a certain period of time (e.g., a "channel occupancy window" 211). As such, the processor 140 may determine the NR time period 208 and the LTE time period 210 to ensure that the NR data 104 and the LTE data 106 may fit within the channel occupancy window 211. Moreover, the processor 140 may determine a time 212 to send the NR data 104, and a time 214 to send the LTE data 106 (e.g., after the NR time period 208 has elapsed from the time 212 to send the NR data 104).

Turning back to FIG. 9, in process block 192, the processor 140 sends the NR data 104 in the NR time period 208 and the LTE data 106 in the LTE time period 210 on the frequency channel 200. In the illustrative of FIG. 10, the processor 140 sends the NR data 104 at the time 212 in the NR time period 208 and the LTE data 106 at the time 214 in the LTE time period 210. In some embodiments, the NR data 104 and the LTE data 106 may be parts of a data packet 216, which may include header information 218 that describes, for example, the NR data size, the LTE data size, how to decode or demodulate the data packet 216, the NR data 104, and/or the LTE data 106 from the carrier signal 110, timing information, and the like. As such, in process block 190, the processor 140 may determine the NR time period 208 and the LTE time period 210 to ensure that the data packet 216, including the NR data 104, the LTE data 106, and the header information 218, fits within the channel occupancy window 211. In this manner, the method 180 may coordinate transmission of the NR data 104 and the LTE data 106 from the network base station 102 over the frequency channel 200. While the method 180 uses the example of downlink transmissions from the base station 102 to the electronic devices 112, 116, the method 180 may also be applied to uplink transmissions. It should be understood that "downlink" refers to data transmission from one or more base stations (e.g., 102) to one or more electronic devices (e.g., 112, 116), and uplink refers to data transmission from one or more electronic devices to one or more base stations.

Figure 11:
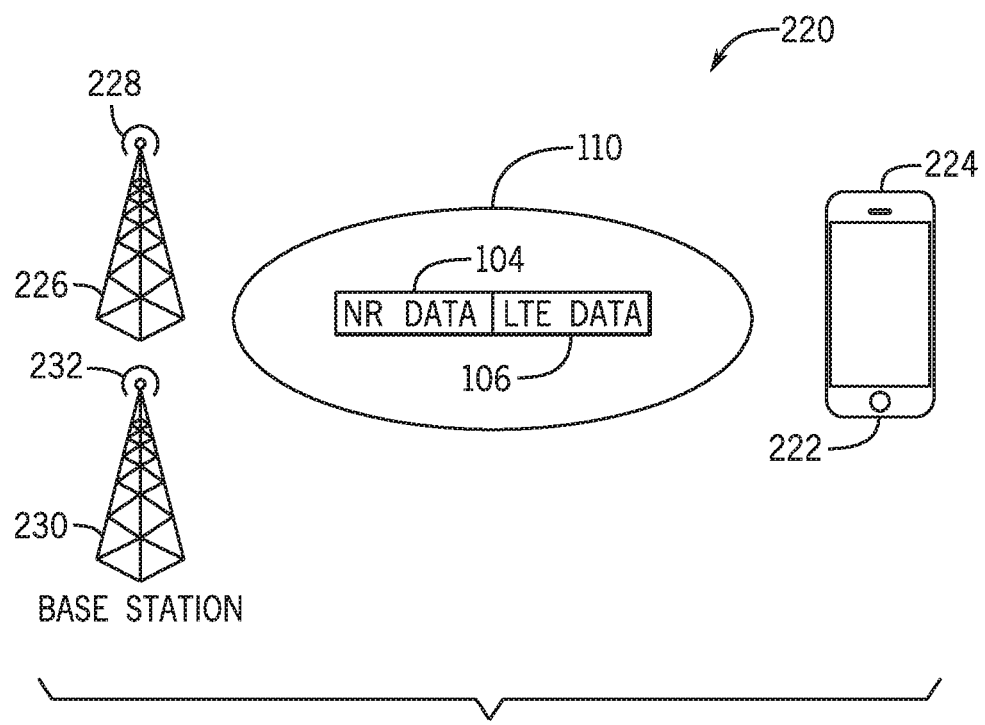
FIG. 11 is a diagram depicting a communication system having an electronic device that coordinates data transmission using multiple network communication standards over a frequency channel, according to embodiments of the present disclosure.

Coordinating Transmission Using Multiple Communication Standards from an Electronic Device Over a Frequency Channel In some embodiments, an electronic device 10 may send and/or receive the NR data 104 and the LTE data 106 on the frequency channel 200, instead of the base station 102. For example, FIG. 11 is a diagram depicting a communication system 220 having an electronic device 222 that coordinates data transmission using multiple network communication standards over a frequency channel, according to embodiments of the present disclosure. Like the network base station 102 of FIG. 7, the electronic device 222 may transmit the NR data 104 and the LTE data 106 via an antenna 224 or an array of antennas 224, over a frequency band or channel of, for example, the unlicensed spectrum. In particular, the electronic device 222 may modulate the NR data 104 on a carrier signal 110 according to the NR standard, and modulate the LTE data 106 on the carrier signal 110 according to the LTE standard. To enable coordination between sending the NR data 104 and the LTE data 106, the electronic device 222 may determine sizes of the NR data 104 and the LTE data 106, determine time periods for which to send the respective data, perform a Listen Before Talk (LBT) procedure over the frequency channel to determine whether the frequency channel is clear of other transmissions, and, if the frequency channel is clear, send the NR data 104 at a first time and the LTE data 106 at a second time based on the determined time periods, as described in further detail below. In this manner, additional LBT procedures performed to confirm that the frequency channel is clear before sending, for example, the LTE data 106, or data collisions between sending the NR data 104 and the LTE data 106, may be avoided, decreasing communication latency and increasing communication speed. It should be understood that the electronic device 222 may transmit the NR data 104 and the LTE data 106 using any suitable different communication standards, including, for example Wi-Fi.

A first base station 226 having a receiver capable of extracting data conforming to the NR standard may receive the carrier signal 110 via one or more antennas 228 of the first base station 226 and demodulate the carrier signal 110 to extract the NR data 104. Similarly, a second base station 230 having a receiver capable of extracting data conforming to the LTE standard may receive the carrier signal 110 via one or more antennas 232 of the second base station 230 and demodulate the carrier signal 110 to extract the LTE data 106. In some embodiments, a single base station (e.g., 226) having a receiver capable of extracting data conforming to the NR standard and a receiver capable of extracting data conforming to the LTE standard (or a receiver capable of extracting data conforming to both the NR and the LTE standards) may receive the carrier signal 110 and extract both the NR data 104 and the LTE data 106. Thus, such a base station may receive both the NR data 104 and the LTE data 106 in a virtually parallel fashion via both the NR and the LTE standards.

Figure 12:
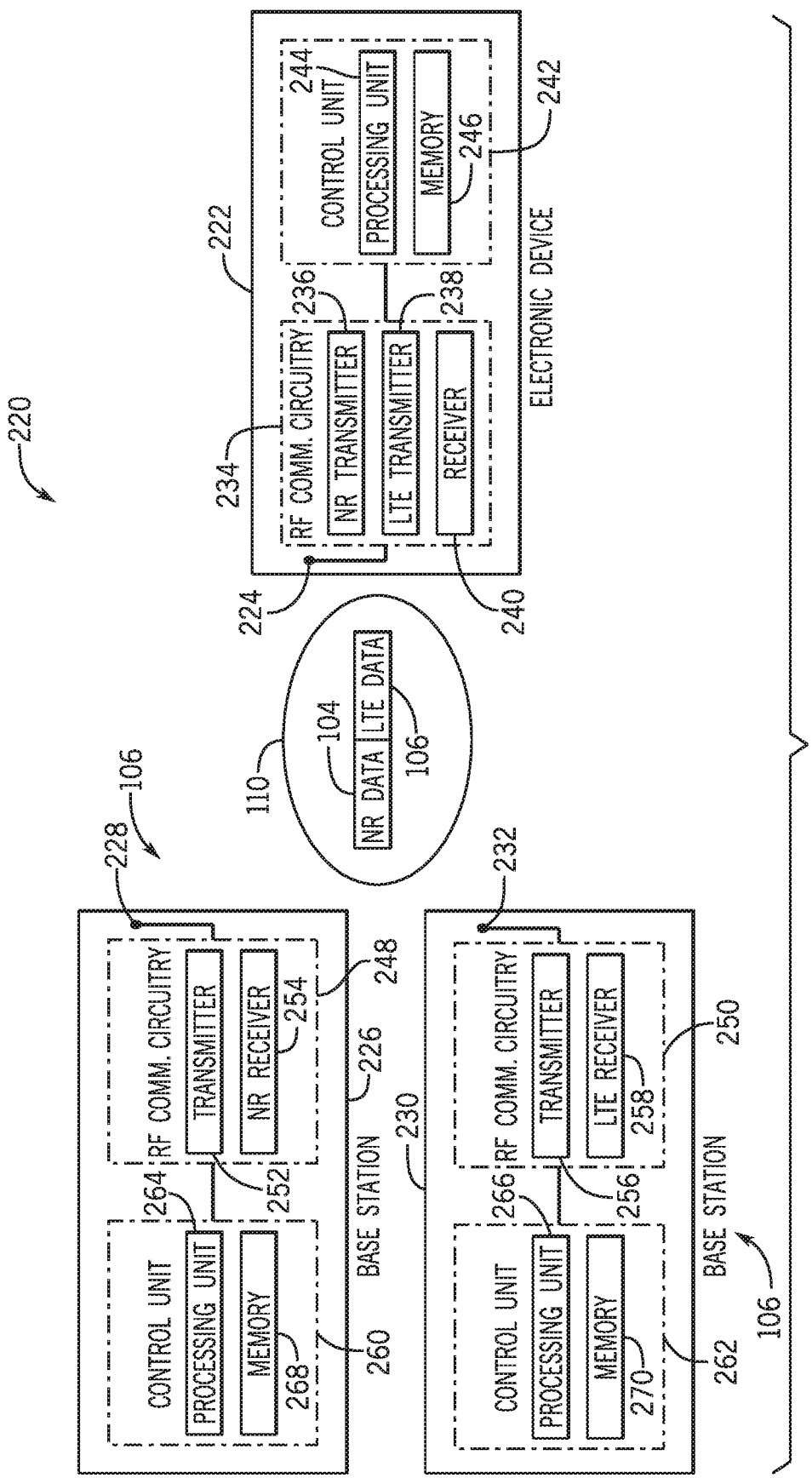
FIG. 12 is a block diagram of the communication system of FIG. 11, according to embodiments of the present disclosure.

FIG. 12 is a block diagram of the communication system 220 of FIG. 11, according to embodiments of the present disclosure. As illustrated, the electronic device 222 includes radio frequency communication circuitry 234 having a first transmitter that sends data according to the NR standard (an NR transmitter 236), a second transmitter that sends data according to the LTE standard (an LTE transmitter 238), and a receiver 240 that receives data, via the one or more antennas 224. In some embodiments, the transmitters 236, 238 may be combined as a single transmitter. As such, the NR transmitter 236 and LTE transmitter 238 may be considered as "co-located" at the electronic device 222. Moreover, in additional or alternative embodiments, at least one of the transmitters 236, 238 and the receiver 240 may be combined as a transceiver. The transmitters 236, 238 and/or the receiver 240 may be driven by control unit 242 to embed the NR data 104 and/or the LTE data 106 onto or extract data from the carrier signal 110. The control unit 242 may include processor 244 and memory 246, which may be similar in structure and/or function to the processor 244 and memory 246 of the base station 102 described in FIG. 8.

The base stations 226, 230 also each includes respective radio frequency communication circuitry 248, 250. The radio frequency communication circuitry 248 of the first base station 226 includes a transmitter 252 and a receiver capable of extracting data conforming to the NR standard (an NR receiver 254), via the one or more antennas 228. Similarly, the radio frequency communication circuitry 250 of the second base station 230 includes a transmitter 256 and a receiver capable of extracting data conforming to the LTE standard (an LTE receiver 258), via the one or more antennas 232. In some embodiments, the transmitters 252, 256 may be combined with the respective receivers 254, 258 as a transceiver. The base stations 226, 230 also each includes respective control units 260, 262 having respective processors 264, 266 and memories 268, 270, which may be similar in structure and/or function to the processors 160, 162 and memories 164, 166 of the electronic devices 112, 116 described in FIG. 8.

The electronic device 222 may send the NR data 104 and the LTE data 106 to the base stations 226, 230 on the frequency channel 200 by coordinating transmission of the NR data 104 and the LTE data 106 according to the method 180 of FIG. 7 and/or according to the timing diagram of FIG. 8.

Coordinating Transmission Using Multiple Communication Standards from Multiple Base Stations Over a Frequency Channel In certain cases, multiple separate base stations may send the NR data 104 and the LTE data 106 on the frequency channel 200, instead of a single base station 102 or electronic device 222. Coordination between the multiple base stations may be performed to prevent or avoid additional LBT procedures (e.g., performed by each base station) used to confirm that the frequency channel is clear, or data collisions between the multiple base stations sending data, decreasing communication latency and increasing communication speed.

Figure 13:
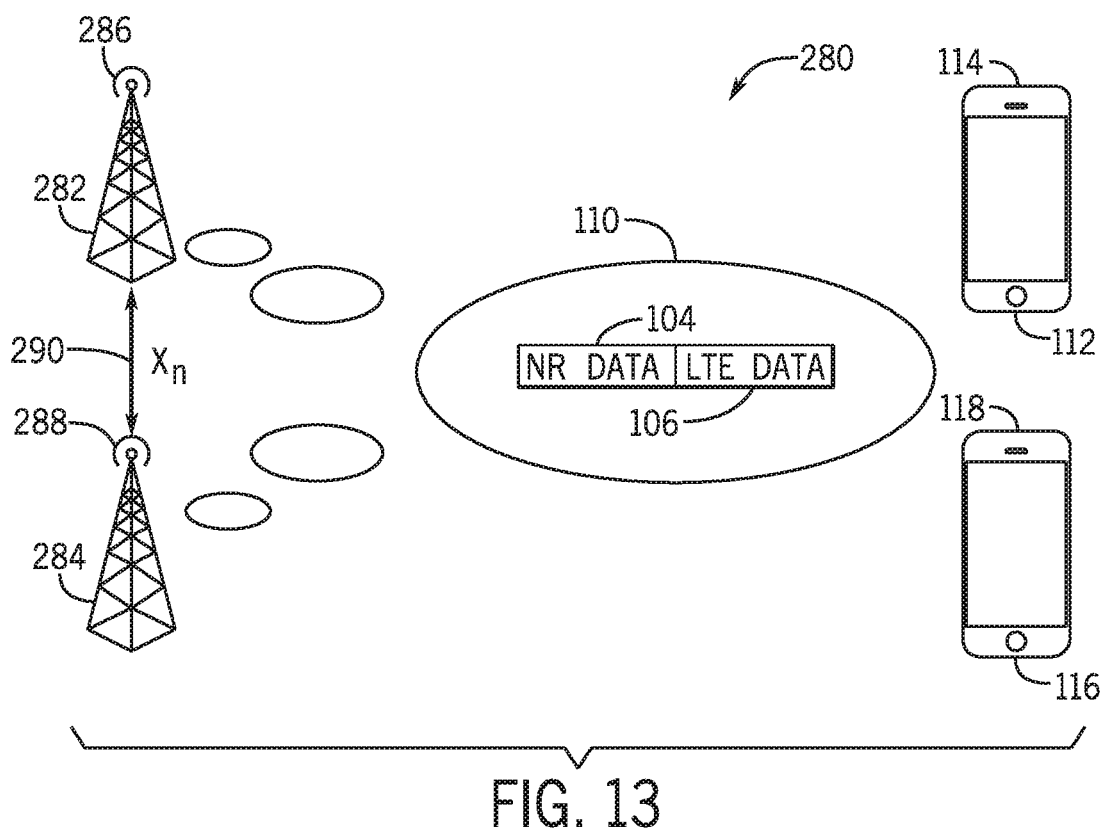
FIG. 13 is a diagram depicting a communication system having multiple base stations that coordinate data transmission using multiple network communication standards over a frequency channel, according to embodiments of the present disclosure.

For example, FIG. 13 is a diagram depicting a communication system 280 having multiple base stations 282, 284 that coordinate data transmission using multiple network communication standards over a frequency channel, according to embodiments of the present disclosure. In particular, a first base station 282 may transmit the NR data 104 via an antenna 286 or an array of antennas 286 over a frequency band or channel of, for example, the unlicensed spectrum, and a second base station 284 may transmit the LTE data 106 via an antenna 288 or an array of antennas 288 over the frequency band or channel.

Figure 15:
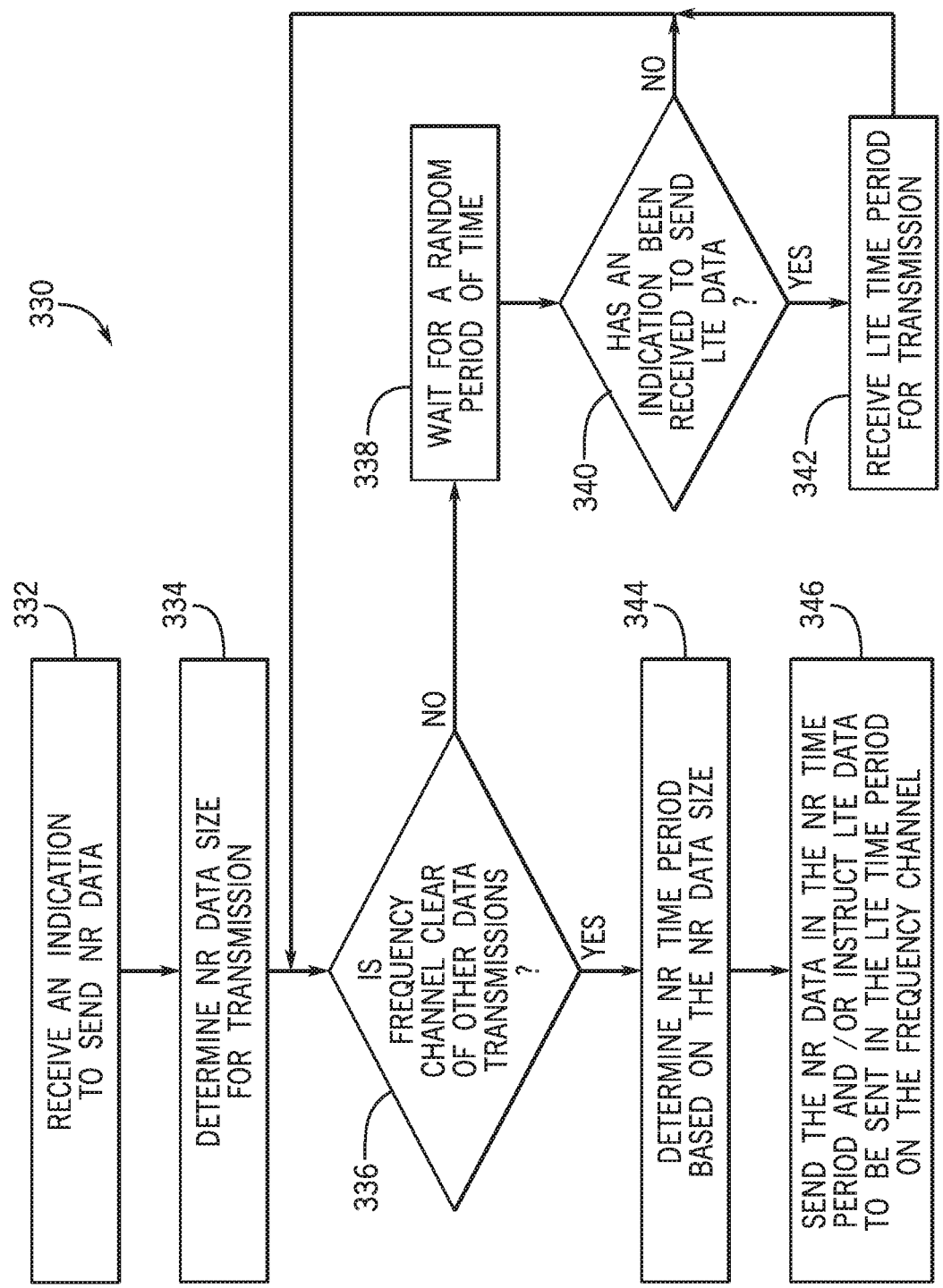
FIG. 15 is a flowchart illustrating a method for coordinating data transmission from the network base stations of FIG. 13 using multiple network communication standards over a frequency channel, according to embodiments of the present disclosure.
Figure 16:
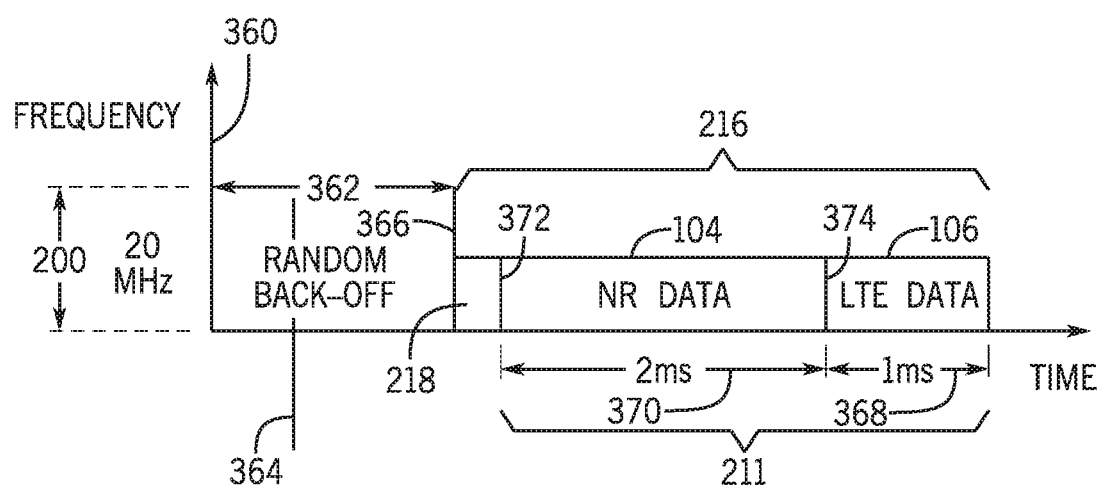
FIG. 16 is a timing diagram of a first base station of FIG. 13 coordinating data transmission using multiple network communication standards over a frequency channel 200, according to embodiments of the present disclosure.

To enable coordination between sending the NR data 104 and the LTE data 106, the first base station 282 may, for example, determine a size of the NR data 104, determine a time period for which to send the NR data 104, receive a time period for which to send the LTE data 106 (as determined and sent from the second base station 284), perform an LBT procedure over the frequency channel to determine whether the frequency channel is clear of other transmissions, and, if the frequency channel is clear, send the NR data 104 at a first time and instruct the second base station 284 to send the LTE data 106 at a second time based on the determined time periods, as described in further detail below with respect to FIGS. 15 and 16.

It should be understood that, in additional or alternative embodiments, the second base station 284 may, for example, determine a size of the LTE data 106, determine a time period for which to send the LTE data 106, receive a time period for which to send the NR data 104 (as determined and sent from the first base station 282), perform the LBT procedure over the frequency channel to determine whether the frequency channel is clear of other transmissions, and, if the frequency channel is clear, send the LTE data 106 at a first time and instruct the first base station 282 to send the NR data 104 at a second time based on the determined time periods. In this manner, additional LBT procedures performed to confirm that the frequency channel is clear before sending, the NR data 104 or the LTE data 106, or data collisions between sending the NR data 104 or the LTE data 106, may be avoided, decreasing communication latency and increasing communication speed. It should be understood that the base stations 282, 284 may transmit the NR data 104 and the LTE data 106 using any suitable different communication standards, including, for example Wi-Fi.

A communication interface, such as an Xn interface 290, may enable the base stations 282, 284 to communicate. In particular, the Xn interface 290 may enable the first base station 282 to receive the time period for which to send the LTE data 106 from the second base station 284 and instruct the second base station 284 to send the LTE data 106. Additionally or alternatively, the Xn interface 290 may enable the second base station 284 to receive the time period for which to send the NR data 104 from the first base station 282 and instruct the first base station 282 to send the NR data 104.

A first electronic device 112 having a receiver capable of extracting data conforming to the NR standard may receive the carrier signal 110 via one or more antennas 114 of the first electronic device 112 and demodulate the carrier signal 110 to extract the NR data 104. Similarly, a second electronic device 116 having a receiver capable of extracting data conforming to the LTE standard may receive the carrier signal 110 via one or more antennas 118 of the second electronic device 116 and demodulate the carrier signal 110 to extract the LTE data 106. Additional details of the first and second electronic devices 112, 116 are provided above with respect to FIGS. 7 and 8. In some embodiments, a single electronic device (e.g., 112) having a receiver capable of extracting data conforming to the NR standard and a receiver capable of extracting data conforming to the LTE standard (or a receiver capable of extracting data conforming to both the NR and the LTE standards) may receive the carrier signal 110 and extract both the NR data 104 and the LTE data 106. Thus, such an electronic device may receive both the NR data 104 and the LTE data 106 in a virtually parallel fashion via both the NR and the LTE standards.

Figure 14:
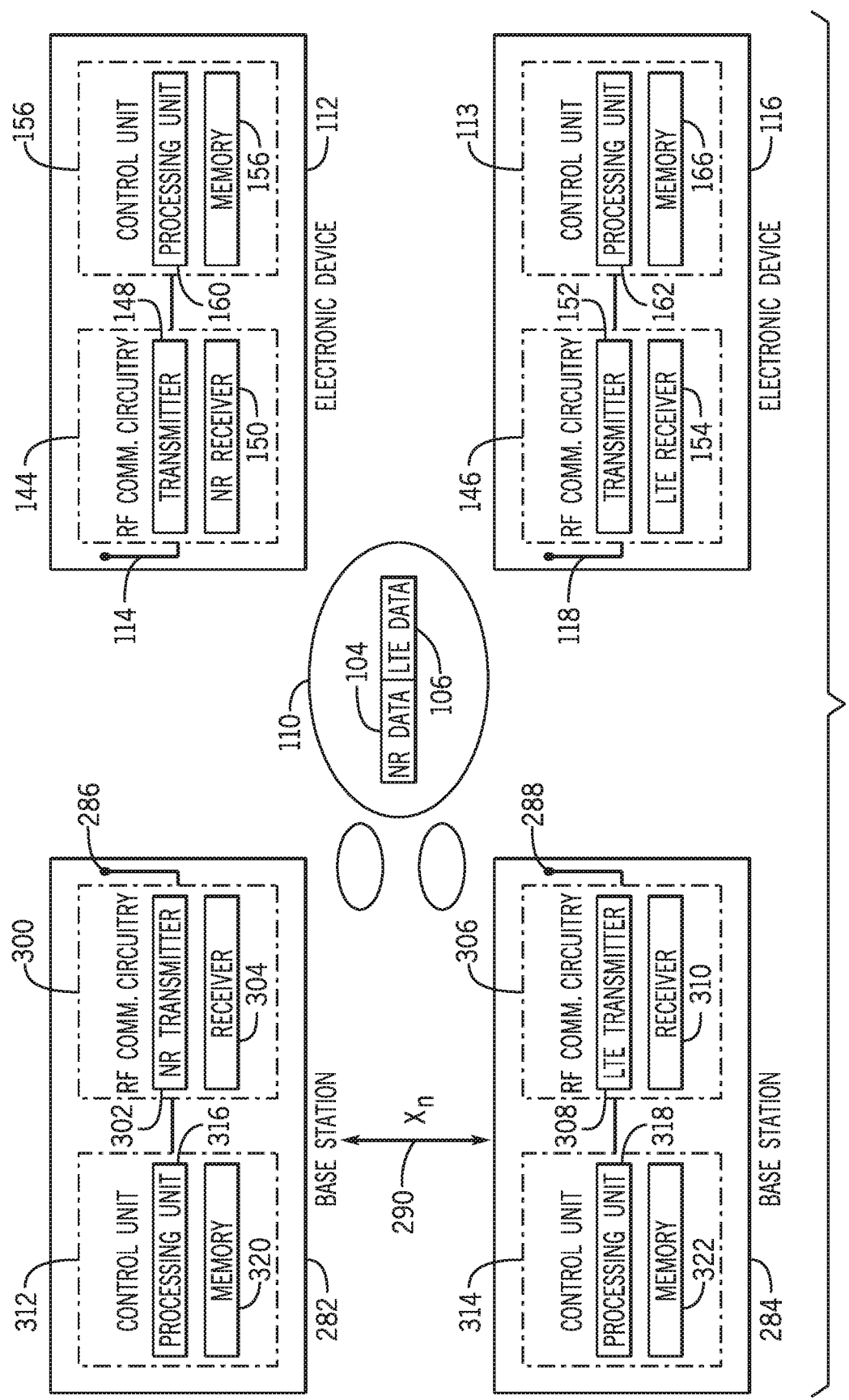
FIG. 14 is a block diagram of the communication system of FIG. 13, according to embodiments of the present disclosure.

FIG. 14 is a block diagram of the communication system 280 of FIG. 13, according to embodiments of the present disclosure. As illustrated, the first base station 282 includes radio frequency communication circuitry 300 having a first transmitter that sends data according to the NR standard (an NR transmitter 302) and a receiver 304 that receives data, via the one or more antennas 286. The second base station 284 also includes radio frequency communication circuitry 306 having a second transmitter that sends data according to the LTE standard (an LTE transmitter 308), and a receiver 310 that receives data, via the one or more antennas 288. As such, the NR transmitter 302 and LTE transmitter 308 may be considered as "non-co-located", as they are disposed in different devices or base stations 282, 284. Moreover, in additional or alternative embodiments, any transmitter 302, 308 may be combined with a respective receiver 304, 310 as a transceiver. The NR transmitter 302 and the receiver 304 of the first base station 282 may be driven by control unit 312 to embed the NR data 104 onto or extract data from the carrier signal 110. Similarly, the LTE transmitter 308 and the receiver 310 of the second base station 284 may be driven by control unit 314 to embed the LTE data 106 onto or extract data from the carrier signal 110. The control units 312, 314 may include respective processors 316, 318 and memories 320, 322, which may be similar in structure and/or function to the processor 244 and memory 246 of the base station 102 described in FIG. 8. The radio frequency communication circuitries 300, 306 of the first and second base stations 282, 284 may also enable access to the Xn interface 290 for communication between the first and second base stations 282, 284.

FIG. 15 is a flowchart illustrating a method 330 for coordinating data transmission from the network base stations 282, 284 using multiple network communication standards over a frequency channel, according to embodiments of the present disclosure. The method 330 may be performed by any suitable device that controls components of the base station 282 and/or the base station 284 of FIGS. 13 and 14, such as the control units 312, 314, the processors 316, 318, and so on. While the method 330 is described using steps in a specific sequence, it should be understood that the present disclosure contemplates that the described steps may be performed in different sequences than the sequence illustrated, and certain described steps may be skipped or not performed altogether. In some embodiments, the method 330 may be implemented by executing instructions stored in a tangible, non-transitory, computer-readable medium, such as the memory 320 and/or the memory 322, using a processor, such as the processor 316 and/or the processor 318.

As illustrated, in process block 332, the processor 316 receives an indication to send NR data 104. The indication may be provided by separate or combined sources (e.g., other electronic device(s)) that send the NR data 104 to the first base station 282, intending for the first electronic device 112 to receive the NR data 104. In some embodiments, at least one of the base stations 282, 284 and the electronic devices 112, 116 may indicate a preferred frequency channel, or frequency range, based on their respective radio frequency capabilities, among other things. In additional or alternative embodiments, the processor 316 may receive an indication to send LTE data 106 (e.g., instead of or in addition to the indication to send the NR data 104).

As an illustrative example, FIG. 16 is a timing diagram of the first base station 282 coordinating data transmission using multiple network communication standards over a frequency channel 200, according to embodiments of the present disclosure. As illustrated, the frequency channel 200 in the unlicensed spectrum has a channel width of 20 MHz, though any suitable channel width is contemplated.

Turning back to FIG. 15, in process block 334, the processor 316 determines the size of the NR data 104 (the NR data size) for transmission. In decision block 336, the processor 316 determines whether the frequency channel 200 is clear of other transmissions. That is, the processor 316 may use the radio frequency communication circuitry 300 and the antenna 286 to determine whether there is any data being transmitted on the frequency channel 200. In the illustrative example of FIG. 16, at time 360, the processor 316 determines if the frequency channel 200 is clear of other transmissions.

Turning back to FIG. 15, if the frequency channel 200 is not clear of other transmissions, then in process block 338, the processor 316 waits for a random back-off time before repeating decision block 336. In the illustrative example of FIG. 16, the processor 316 waits for the random back-off time 362 to determine if the frequency channel 200 is clear of other transmissions.

During or after the random back-off time 362, in process block 340, the processor 316 determines whether an indication has been received to send the LTE data 106. The indication may be sent from the second base station 284 via the Xn interface 290, which may in turn be provided by separate or combined sources (e.g., other electronic device(s)) that send the LTE data 106 to the second base station 284, intending for the second electronic device 116 to receive the LTE data 106. In the illustrative example of FIG. 16, at time 364, the processor 316 receives an indication to send the LTE data 106 from the second base station 284.

Turning back to FIG. 15, if the indication to send the LTE data 106 has been received, then the processor 316, in process block 342, receives a time period to send the LTE data 106 (an LTE time period). In particular, the second base station 284 may determine the size of the LTE data 106 (the LTE data size), and then determine the LTE time period based on the LTE data size, a data packet size 216, and/or a channel occupancy window 211. In the illustrative example of FIG. 16, the processor 316 determines that the LTE time period 368 is one ms. The second base station 284 may then send the LTE time period 368 to the first base station 282. In additional or alternative embodiments, the second base station 284 may send the LTE data size to the first base station 282, and the processor 316 of the first base station 282 may then determine the LTE time period 368 based on the LTE data size, a data packet size 216, and/or a channel occupancy window 211. Once the random back-off time 362 has elapsed, the processor 316 repeats decision block 336 by determining whether the frequency channel 200 is clear of other transmissions at time 366.

Once the processor 316 has determined that the frequency channel 200 is clear of other transmissions, then in process block 344, the processor 316 determines a time period to send the NR data 104 (an NR time period) based on the NR data size. The processor 316 may additionally or alternatively determine the NR time period based on the LTE time period 368, a data packet size 216, and/or a channel occupancy window 211. In the illustrative example of FIG. 16, the processor 316 determines that the NR time period 370 is two ms. In some embodiments, the processor 140 may determine the NR time period 370 and/or the LTE time period 368 to ensure that the NR data 104 and the LTE data 106 may fit within the channel occupancy window 211. Moreover, the processor 140 may determine a time 372 to send the NR data 104, and a time 374 to send the LTE data 106 (e.g., after the NR time period 370 has elapsed from the time 372 to send the NR data 104). In some embodiments, the NR data 104 and the LTE data 106 may be too large to send in the data packet size 216 fitting in the channel occupancy window 211. As such, the processor 140 may determine a portion of the NR data 104 to send in the NR time period 370 and/or a portion of the LTE data 106 to send in the LTE time period 368. The remainder of the NR data 104 and/or the LTE data 106 may then be sent in a subsequent transmission.

Turning back to FIG. 15, in process block 346, the processor 140 sends the NR data 104 in the NR time period 370, and instructs the second base station 284 to send the LTE data 106 in the LTE time period 368 on the frequency channel 200. In the illustrative example of FIG. 10, the processor 140 sends the NR data 104 at the time 372 in the NR time period 370, and the second base station 284 sends the LTE data 106 at the time 374 in the LTE time period 368. In some embodiments, the NR data 104 and the LTE data 106 may be sent as parts of a data packet 216, which may include header information 218 that describes, for example, the NR data size, the LTE data size, how to decode or demodulate the data packet 216, the NR data 104, and/or the LTE data 106 from the carrier signal 110, timing information, and the like. As such, in process block 344, the processor 316 may determine the NR time period 370 and/or the LTE time period 368 to ensure that the data packet 216, including the NR data 104, the LTE data 106, and the header information 218, fits within the channel occupancy window 211. In this manner, the method 330 may coordinate transmission of the NR data 104 from a first base station 282 and the LTE data 106 from a second base station 284 over the frequency channel 200. While the method 330 uses the example of downlink transmissions from the base stations 282, 284 to the electronic devices 112, 116, the method 330 may also be applied to uplink transmissions. Moreover, it should be understood that while the method 330 describes a first base station 282 sending NR data 104 in an initial process block 332, in additional or alternative embodiments, the second base station 284 may send the LTE data 106 in the initial process block, and may later receive an indication from the first base station 282 to send the NR data 104.

Coordinating Transmission and Reception Using Multiple Communication Standards Over a Frequency Channel Coordination between data (e.g., NR data 104 and/or LTE data 106) received and data (e.g., NR data 104 and LTE data 106) sent on the frequency channel 200 (e.g., within the channel occupancy window 211) may also be performed to reduce additional LBT procedures (e.g., performed for receiving data and sending data) used to confirm that the frequency channel is clear, or data collisions between the receiving and sending the data, decreasing communication latency and increasing communication speed. For example, a base station 102 may include both NR and LTE transmitters, and be supported by secondary cells for downlink communication according to the NR and LTE standards, but may also include an NR receiver and be supported by secondary cells for uplink communication for the NR standard.

Figure 17:
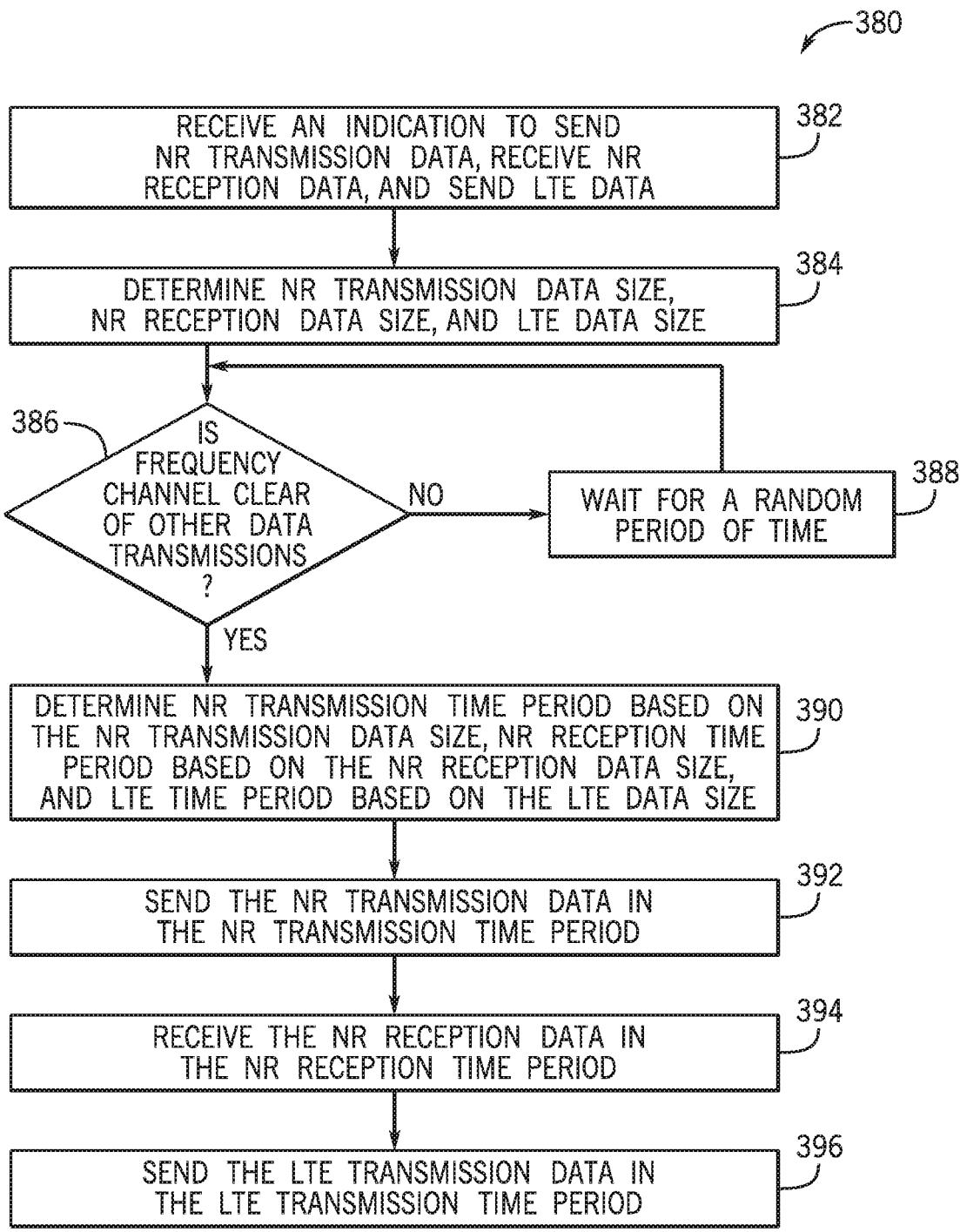
FIG. 17 is a flowchart illustrating a method for coordinating transmission and reception of data at the base station of FIG. 7 using multiple network communication standards over a frequency channel, according to embodiments of the present disclosure.

FIG. 17 is a flowchart illustrating a method 380 for coordinating transmission and reception of data at the base station 102 using multiple network communication standards over a frequency channel 200, according to embodiments of the present disclosure. The method 380 is discussed using the example of the base station 102 of FIGS. 7 and 8, though it should be understood that one or more base stations 102 and/or one or more electronic devices 10 may perform the method 380, such as those illustrated in FIGS. 11-14. Moreover, while the example includes the capability of uplink communication using the NR standard but not the LTE standard, it should be understood that, in additional or alternative embodiments, the base station may have the capability of uplink communication using the LTE standard, or any other suitable wireless communication standard, such as Wi-Fi.

The method 380 may be performed by any suitable device that controls components of the base station 102, such as the control unit 138, the processor 140, and so on. While the method 380 is described using steps in a specific sequence, it should be understood that the present disclosure contemplates that the described steps may be performed in different sequences than the sequence illustrated, and certain described steps may be skipped or not performed altogether. In some embodiments, the method 380 may be implemented by executing instructions stored in a tangible, non-transitory, computer-readable medium, such as the memory 142, using a processor, such as the processor 140

Figure 18:
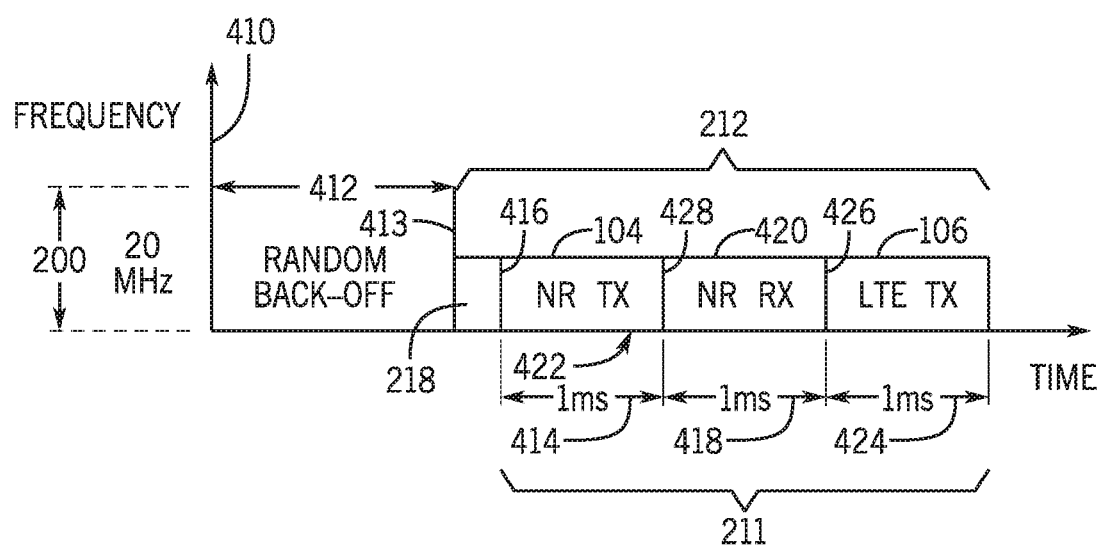
FIG. 18 is a timing diagram of the base station of FIG. 7 coordinating transmission and reception of data using multiple network communication standards over a frequency channel, according to embodiments of the present disclosure.

As illustrated, in process block 382, the processor 140 receives an indication to send first NR data 104 (NR transmission data), receive second NR data (NR reception data), and send LTE data 106. In some embodiments, at least one of the base station 102 and the electronic devices 112, 116 may indicate a preferred frequency channel. As an illustrative example, FIG. 18 is a timing diagram of the base station 102 coordinating transmission and reception of data using multiple network communication standards over the frequency channel 200, according to embodiments of the present disclosure. As illustrated, the frequency channel 200 in the unlicensed spectrum has a channel width of 20 MHz, though any suitable channel width is contemplated.

Turning back to FIG. 17, in process block 384, the processor 140 determines the size of the NR data 104 to be sent (the NR transmission data size), the size of the NR data to be received (the NR reception data size), and the LTE data 106 to be sent (the LTE data size). In decision block 386, the processor 316 determines whether the frequency channel 200 is clear of other transmissions. In the illustrative example of FIG. 18, at time 410, the processor 140 determines if the frequency channel 200 is clear of other transmissions.

Turning back to FIG. 17, if the frequency channel 200 is not clear of other transmissions, then in process block 388, the processor 140 waits for a random back-off time before repeating process block 386. In the illustrative example of FIG. 18, the processor 140 waits for the random back-off time 412 to determine if the frequency channel 200 is clear of other transmissions. Once the random back-off time 412 has elapsed, the processor 140 repeats decision block 386 by determining whether the frequency channel 200 is clear of other transmissions at time 413.

Once the processor 140 has determined that the frequency channel 200 is clear of other transmissions, then in process block 390, the processor 140 determines a time period to send the NR data 104 (an NR transmission time period) based on the NR data size, a time period to receive NR data (an NR reception time period), and a time period to send the LTE data 106 (an LTE transmission time period). In particular, when transferring downlink and uplink data in a frame (which may include a packet, such that the frame size may correspond to the packet size) using certain wireless communication standards, such as NR, LTE, or Wi-Fi (e.g., in a time division duplex mode), the downlink data and uplink data may be predetermined and/or specified (e.g., by the base station 102). This may facilitate informing receiving devices (e.g., the electronic devices 112, 116) when to expect to receive data. As such, the processor 140 may determine the NR transmission time period, the NR reception time period, and/or the LTE transmission time period (and in some cases the NR transmission data size, the NR reception data size, and/or the LTE data size) based on these time division duplex downlink and uplink frame specifications. It should be understood that the NR transmission data 104, the NR reception data, and the LTE data 106 are used as examples in the disclosed embodiment, and, in additional or alternative embodiments, LTE data may be received in an LTE reception time period, while any of the NR transmission data 104, NR reception data, and LTE data 106 being transmitted may be omitted.

In the illustrative example of FIG. 18, the NR transmission time period 414 ("NR TX") of one ms for the NR transmission data 104 begins at an NR transmission time 416, the NR reception time period 418 ("NR RX") of one ms for NR reception data 420 begins at an NR reception time 422, and the LTE transmission time period 424 ("LTE TX") of one ms for the LTE data 106 begins at an LTE transmission time 426. In some embodiments, the NR transmission data 104, the NR reception data 420, and the LTE data 106 may be too large to transferred in the data packet size 216 fitting in the channel occupancy window 211. As such, the processor 140 may determine a portion of the NR transmission data 104 to send in the NR transmission time period 416, a portion of the NR reception data 420 to receive in the NR reception time period 422, and/or a portion of the LTE data 106 to send in the LTE time period 424. The remainder of the NR transmission data 104, the NR reception data 420, and/or the LTE data 106 may then be transferred in a subsequent communication.

Turning back to FIG. 17, in process block 392, the processor 140 sends the NR transmission data 104 in the NR time period 414 beginning at the NR transmission time 416. In process block 394, the processor 140 receives the NR reception data 420 in the NR time period 414 beginning at the NR transmission time 416. In some embodiments, even though the base station 102 specifies that the electronic device 112 is to receive the NR reception data 420 in the NR time period 414, the electronic device 112 may nevertheless listen to the frequency channel 200 for a time period 428 to ensure that the frequency channel 200 is clear. The time period 428 may be any suitable period of time for the electronic device 112 to determine that the frequency channel is clear, such as 25 microseconds. In process block 396, the processor 140 sends the LTE transmission data 106 in the LTE transmission time period 424 beginning at the LTE transmission time 426.

In some embodiments, the NR transmission data 104, the NR reception data 420, and the LTE data 106 may be transferred as parts of a data packet 216, which may include header information 218 that describes, for example, the NR transmission data size, the NR reception data size, the LTE data size, how to decode or demodulate the data packet 216, the NR transmission data 104, the NR reception data 420, and/or the LTE data 106 from the carrier signal 110, timing information, and the like. As such, in process block 390, the processor 140 may determine the NR transmission time period 416, the NR reception time period 418, and/or the LTE time period 424 to ensure that the data packet 216, including the NR transmission data 104, the NR reception data 420, the LTE data 106, and the header information 218, fits within the channel occupancy window 211. In this manner, the method 380 may coordinate transmission and reception of data over the frequency channel 200.

Coordinating Transmission Using Multiple Communication Standards Using Multiple Frequency Channels Multiple frequency channels may also be used to send or receive data (e.g., NR data 104 and/or LTE data 106) using multiple communication standards. That is, data may be broken up to send on the multiple frequency channels (e.g., in parallel), instead of sending the data on a single frequency channel, thus increasing throughput and speed of receiving data. Coordination may be performed on the data sent on at least one of the multiple frequency channels using multiple communication standards to reduce additional LBT procedures used to confirm that the frequency channel is clear, or data collisions between the sending, for example, the NR data 104 and the LTE data 106, decreasing communication latency and increasing communication speed.

Figure 19:
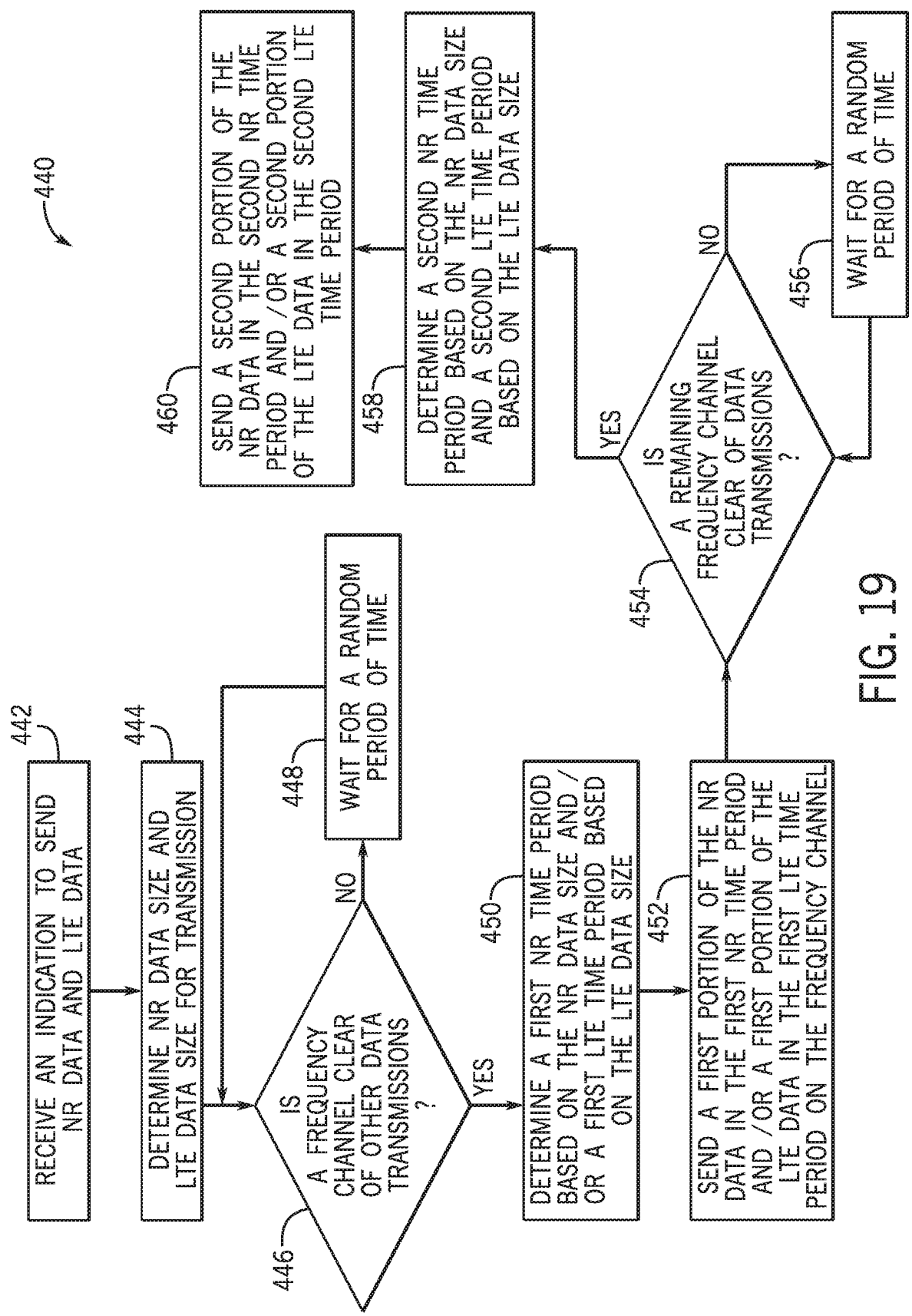
FIG. 19 is a flowchart illustrating a method for coordinating data transmission at the base station of FIG. 7 using multiple network communication standards over multiple frequency channels, according to embodiments of the present disclosure.

FIG. 19 is a flowchart illustrating a method 440 for coordinating data transmission at the base station 102 using multiple network communication standards over multiple frequency channels, according to embodiments of the present disclosure. The method 440 is discussed using the example of the base station 102 of FIGS. 7 and 8, though it should be understood that one or more base stations 102 and/or one or more electronic devices 10 may perform the method 440, such as those illustrated in FIGS. 11-14.

The method 440 may be performed by any suitable device that controls components of the base station 102, such as the control unit 138, the processor 140, and so on. While the method 440 is described using steps in a specific sequence, it should be understood that the present disclosure contemplates that the described steps may be performed in different sequences than the sequence illustrated, and certain described steps may be skipped or not performed altogether. In some embodiments, the method 440 may be implemented by executing instructions stored in a tangible, non-transitory, computer-readable medium, such as the memory 142, using a processor, such as the processor 140.

As illustrated, in process block 442, the processor 140 receives an indication to send NR data 104 and LTE data 106. The indication may be provided by separate or combined sources (e.g., other electronic device(s)) that send the NR data 104 and LTE data 106 to the base station 102, intending for the first electronic device 112 to receive the NR data 104 and the second electronic device 116 to receive the LTE data 106. In some embodiments, at least one of the base stations 102 and the electronic devices 112, 116 may indicate at least one preferred frequency channel, or frequency range, based on their respective radio frequency capabilities, among other things.

Figure 20:
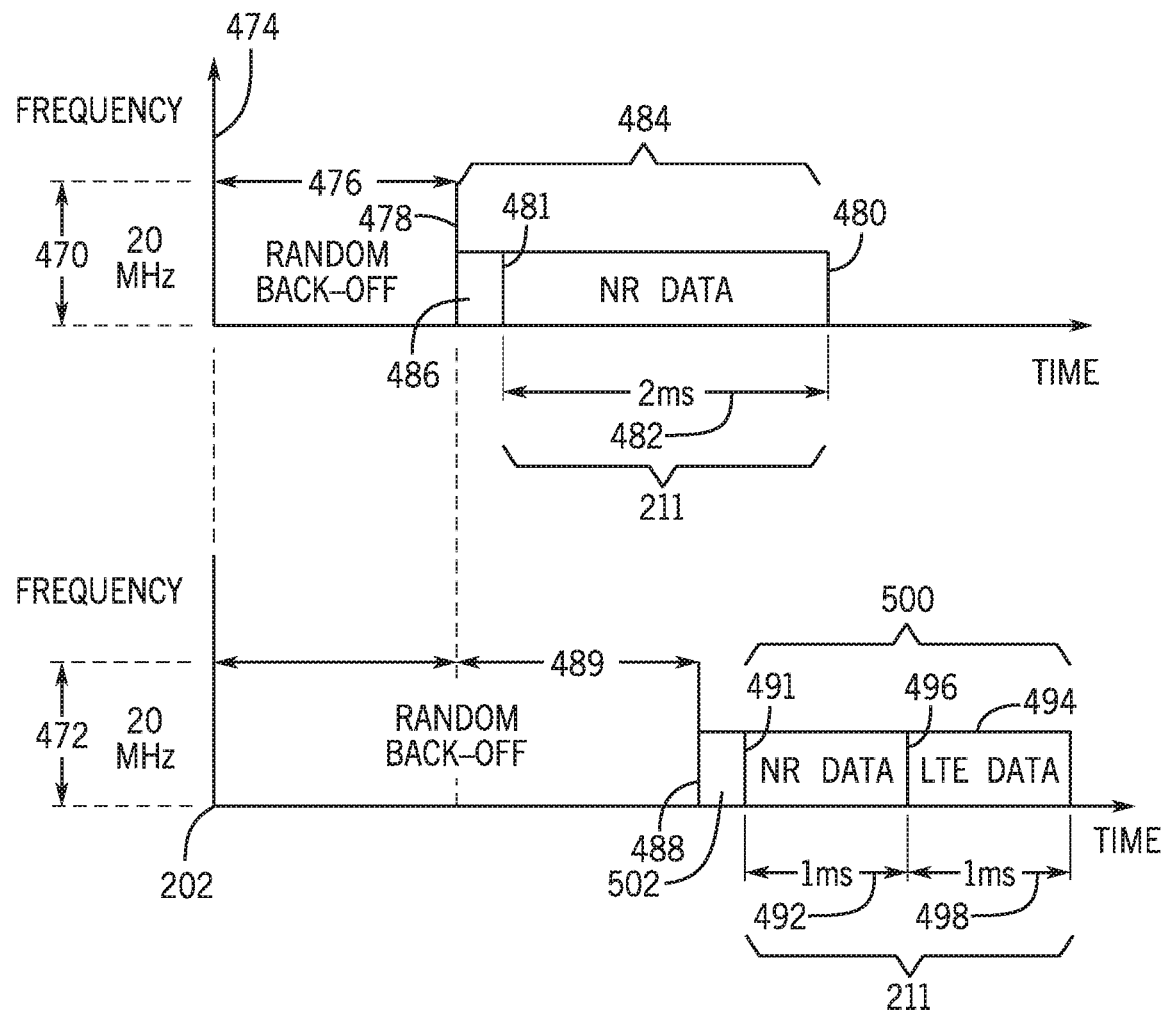
FIG. 20 is a timing diagram of the base station of FIG. 7 coordinating data transmission using multiple network communication standards over multiple frequency channels, according to embodiments of the present disclosure.

As an illustrative example, FIG. 20 is a timing diagram of the base station 102 coordinating data transmission using multiple network communication standards over multiple frequency channels 470, 472, according to embodiments of the present disclosure. As illustrated, the frequency channels 470, 472 in the unlicensed spectrum have a channel width of 20 MHz, though any suitable channel width is contemplated. Moreover, because data (e.g., the NR data 104) is sent using one communication standard (e.g., the NR standard) on the frequency channel 470, then that frequency channel 470 may be in the designated spectrum for that communication standard, instead of the unlicensed spectrum, as that frequency channel 470 is not being used to send data conforming to multiple communication standards.

Turning back to FIG. 19, in process block 444, the processor 140 determines the size of the NR data 104 (the NR data size) and the size of the LTE data 106 (the LTE data size) for transmission. In decision block 446, the processor 140 determines whether a frequency channel among multiple frequency channels (470, 472) in the shared, unlicensed spectrum is clear of other transmissions. In the illustrative example of FIG. 20, at time 474, the processor 140 determines if the first frequency channel 470 and the second frequency channel 472 are clear of other transmissions.

Turning back to FIG. 19, if a frequency channel (e.g., 470, 472) is not clear of other transmissions, then in process block 448, the processor 140 waits for a random back-off time before repeating decision block 446. In the illustrative example of FIG. 20, the processor 140 waits for the random back-off time 476 to determine if a frequency channel 470, 472 is clear of other transmissions. Once the random back-off time 476 has elapsed, the processor 140 repeats decision block 446 by determining whether a frequency channel 470, 472 is clear of other transmissions at time 478. At time 478, the processor 140 determines that the first frequency channel 470 is clear of other transmissions. As illustrated, at time 478, the second frequency channel 472 is not clear of other transmissions.

Once the processor 140 has determined that a frequency channel among multiple frequency channels 470, 472 is clear of other transmissions, then in process block 450, the processor 140 determines a time period to send the NR data 104 (a first NR time period) based on the NR data size and/or a time period to send the LTE data 106 (a first LTE time period) based on the LTE data size, on the clear frequency channel. In particular, the NR data 104 and the LTE data 106 may be too large to send in a data packet fitting in a channel occupancy window on the frequency channel 470. As such, the processor 140 may determine a portion of the NR data 104 to send in the first NR time period and/or a portion of the LTE data 106 to send in the first LTE time period. The processor 140 may additionally or alternatively determine the first NR time period and/or the first LTE time period based on one another, a data packet size, and/or a channel occupancy window.

In the illustrative example of FIG. 20, the processor 140 determines to send a portion 480 of the NR data 104 on the frequency channel 470 at a time 481 in a first NR time period 482 of two ms. In additional or alternative embodiments, the processor 140 may determine a first LTE time period to send the LTE data 106 on the frequency channel 470 in addition to or instead of the first NR time period 482.

Turning back to FIG. 19, in process block 452, the processor 140 sends the portion 480 of the NR data 104 at time 481 in the first NR time period 482, as illustrated in FIG. 20. In some embodiments, the portion 480 of the NR data 104 may be sent as part of a data packet 484, which may include header information 486 that describes, for example, the size of the portion 480 of the NR data 104, how to decode or demodulate the data packet 484 and/or the portion 480 of the NR data 104 from the carrier signal 110, timing information, and the like. As such, in process block 450, the processor 140 may determine the first NR time period 482 ensure that the data packet 484, including the portion 480 of the NR data 104 and the header information 218, fits within the channel occupancy window 211.

In decision block 454, the processor 140 determines whether a remaining frequency channel among the multiple frequency channels (470, 472) in the shared, unlicensed spectrum is clear of other transmissions. In the illustrative example of FIG. 20, at time 478, the processor 140 determines if the second frequency channel 472 is clear of other transmissions.

Turning back to FIG. 19, if a remaining frequency channel (e.g., 472) is not clear of other transmissions, then in process block 456, the processor 140 waits for a random back-off time before repeating decision block 454. In the illustrative example of FIG. 20, the processor 140 waits for the random back-off time 489 to determine if the second frequency channel 472 is clear of other transmissions. Once the random back-off time 489 has elapsed, the processor 140 repeats decision block 454 by determining whether the second frequency channel 472 is clear of other transmissions at time 488. At time 488, the processor 140 determines that the second frequency channel 472 is clear of other transmissions.

Once the processor 140 has determined that a remaining frequency channel is clear of other transmissions, then in process block 458, the processor 140 determines a time period to send a second portion of the NR data 104 (a second NR time period) based on the NR data size and/or a time period to send the LTE data 106 (a second LTE time period) based on the LTE data size, on the second frequency channel 472.

In the illustrative example of FIG. 20, the processor 140 determines to send a second portion 490 of the NR data 104 on the second frequency channel 472 at a time 491 in a second NR time period 492 of one ms. The processor 140 also determines to send at least a portion 494 of the LTE data 106 on the second frequency channel 472 at a time 496 in an LTE time period 498 of one ms. It should be noted that if the processor 140 determined to send a first portion of the LTE data 106 in a first LTE time period on the first frequency channel 470 in process block 452, then the LTE time period 498 may be a second LTE time period for which the portion 494 is a second portion of the LTE data 106 sent on the second frequency channel 472.

Turning back to FIG. 19, in process block 460, the processor 140 sends the second portion 490 of the NR data 104 at time 491 in the second NR time period 492 and at least the portion 494 of the LTE data 106 at time 496 on the second frequency channel 472, as illustrated in FIG. 20. In some embodiments, the second portion 490 of the NR data 104 and at least the portion 494 of the LTE data 106 may be sent as part of a data packet 500, which may include header information 502 that describes, for example, the size of the second portion 490 of the NR data 104, the size of at least the portion 494 of the LTE data 106, how to decode or demodulate the data packet 500, the second portion 490 of the NR data 104, and/or at least the portion 494 of the LTE data 106 from the carrier signal 110, timing information, and the like. As such, in process block 458, the processor 140 may determine the second NR time period 492 and/or the LTE time period 498 to ensure that the data packet 500, including the second portion 490 of the NR data 104, at least the portion 494 of the LTE data 106, and the header information 502, fits within the channel occupancy window 211.

In this manner, the method 440 may coordinate transmission of the NR data 104 and LTE data 106 over multiple frequency channels 470, 472. While the method 440 uses the example of downlink transmissions from the base station 102 to the electronic devices 112, 116, the method 440 may also be applied to uplink transmissions. Moreover, it should be understood that while the method 440 describes a base station 102 sending NR data 104 in an initial process block 442, in additional or alternative embodiments, the base station 102 may send the LTE data 106 in the initial process block, and may later receive an indication to send the LTE data 106.

Coordinating Frequency-Divided Transmission Using Multiple Communication Standards Over a Frequency Channel Thus far, the presently disclosed embodiments have divided the data packet and the channel occupancy window between NR data 104 and LTE data 106 in the time domain. For example, if the channel occupancy is four ms, the data packet may include an NR time period for sending the NR data 104 of two ms, and an LTE time period for sending the LTE data of two ms. In some embodiments, the data packet and the channel occupancy window may instead or additionally be divided in the frequency domain (such that a first frequency range of the frequency channel may be used to send the NR data 104, while a second frequency range of the frequency channel may be used to send the LTE data 106.

Figure 21:
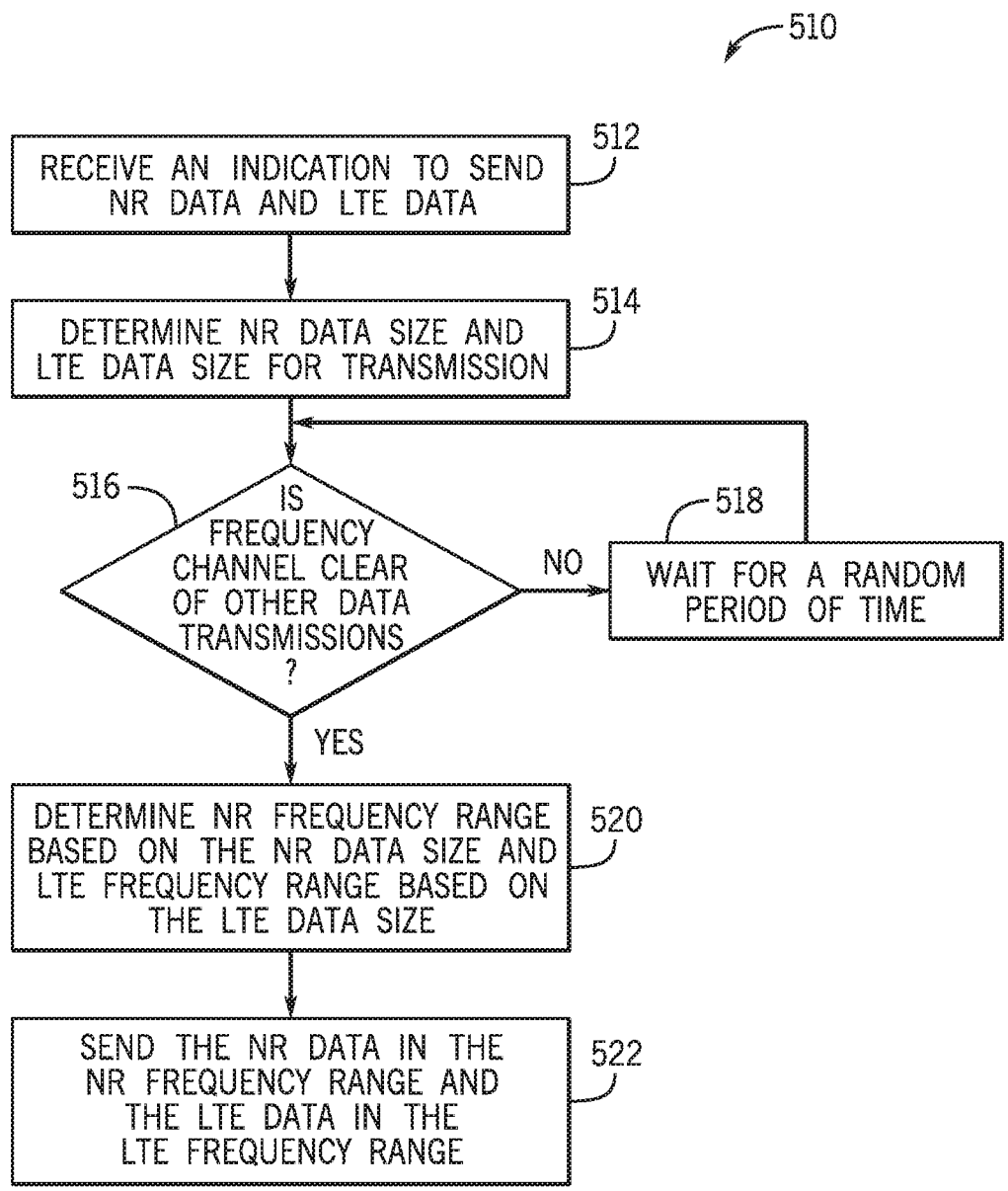
FIG. 21 is a flowchart illustrating a method for coordinating frequency-divided data transmission at the base station of FIG. 7 using multiple network communication standards over a frequency channel, according to embodiments of the present disclosure.

FIG. 21 is a flowchart illustrating a method 510 for coordinating frequency-divided data transmission at the base station 102 using multiple network communication standards over a frequency channel, according to embodiments of the present disclosure. The method 510 is discussed using the example of the base station 102 of FIGS. 7 and 8, though it should be understood that one or more base stations 102 and/or one or more electronic devices 10 may perform the method 510, such as those illustrated in FIGS. 11-14.

The method 510 may be performed by any suitable device that controls components of the base station 102, such as the control unit 138, the processor 140, and so on. While the method 510 is described using steps in a specific sequence, it should be understood that the present disclosure contemplates that the described steps may be performed in different sequences than the sequence illustrated, and certain described steps may be skipped or not performed altogether. In some embodiments, the method 510 may be implemented by executing instructions stored in a tangible, non-transitory, computer-readable medium, such as the memory 142, using a processor, such as the processor 140.

As illustrated, in process block 512, the processor 140 receives an indication to send NR data 104 and LTE data 106. The indication may be provided by separate or combined sources (e.g., other electronic device(s)) that send the NR data 104 and LTE data 106 to the base station 102, intending for the first electronic device 112 to receive the NR data 104 and the second electronic device 116 to receive the LTE data 106. In some embodiments, at least one of the base stations 102 and the electronic devices 112, 116 may indicate at least one preferred frequency channel, or frequency range, based on their respective radio frequency capabilities, among other things.

Figure 22:
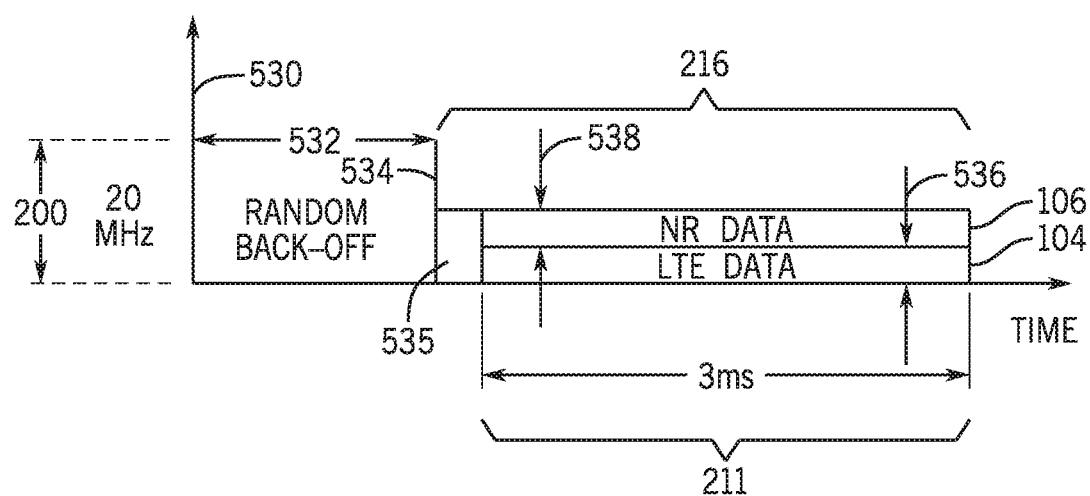
FIG. 22 is a timing diagram of the base station of FIG. 7 coordinating frequency-divided data transmission using multiple network communication standards over a frequency channel, according to embodiments of the present disclosure.

As an illustrative example, FIG. 22 is a timing diagram of the base station 102 coordinating frequency-divided data transmission using multiple network communication standards over a frequency channel 200, according to embodiments of the present disclosure. As illustrated, the frequency channel 200 in the unlicensed spectrum has a channel width of 20 MHz, though any suitable channel width is contemplated.

Turning back to FIG. 21, in process block 514, the processor 140 determines the size of the NR data 104 (the NR data size) and the size of the LTE data 106 (the LTE data size) for transmission. In decision block 516, the processor 140 determines whether the frequency channel in the unlicensed spectrum is clear of other transmissions. In the illustrative example of FIG. 22, at time 530, the processor 140 determines if the frequency channel 200 is clear of other transmissions.

Turning back to FIG. 21, if the frequency channel 200 is not clear of other transmissions, then in process block 518, the processor 140 waits for a random back-off time before repeating decision block 516. In the illustrative example of FIG. 22, the processor 140 waits for the random back-off time 532 to determine if the frequency channel 200 is clear of other transmissions. Once the random back-off time 532 has elapsed, the processor 140 repeats decision block 516 by determining whether the frequency channel 200 is clear of other transmissions at time 534. At time 534, the processor 140 determines that the frequency channel 200 is clear of other transmissions.

Once the processor 140 has determined that the frequency channel 200 is clear of other transmissions, then in process block 520, the processor 140 determines a frequency range to send the NR data 104 (an NR frequency range) based on the NR data size and/or a frequency range to send the LTE data 106 (an LTE frequency range) based on the LTE data size, on the frequency channel 200. For example, the processor 140 may determine the NR frequency range and the LTE frequency based on the proportion of NR data 104 to LTE data 106. That is, if the proportion of the NR data 104 to the LTE data 106 is 2:3, then the proportion of the bandwidth of the NR frequency range to the bandwidth of the LTE frequency range may also be 2:3. In cases where the NR data size and the LTE data size are too great to be sent in a single transmission (e.g., in a data packet within a channel occupancy window 211), portions of the NR data 104 and/or the LTE data 106 may be sent. As such, the NR frequency range and/or the LTE frequency may be based on the size of the portion of the NR data 104 and/or the size of the portion of the LTE data 106.

In the illustrative example of FIG. 22, the processor 140 determines to send the NR data 104 in a first half of the frequency range (e.g., a first 10 MHz range) of the frequency channel 200 at the time 534. The processor 140 also determines to send the LTE data 106 in a second half of the frequency range (e.g., a second 10 MHz range) of the frequency channel 200 at the time 534. The first half of the frequency range used to send the NR data 104 may be referred to as the NR frequency range 536, and the second half of the frequency range used to send the LTE data 106 may be referred to as the LTE frequency range 538. While FIG. 22 illustrates the NR frequency range 536 having the same range as the LTE frequency range 538, it should be understood that in other cases, the NR frequency range 536 and the LTE frequency range 538 may be different (e.g., when the NR data size and the LTE data size are different).

Turning back to FIG. 19, in process block 522, the processor 140 sends the NR data 104 at time 534 in the NR frequency range 536 and the LTE data 106 at time 534 in the LTE frequency range 538, as illustrated in FIG. 22. In some embodiments, the NR data 104 and the LTE data 106 may be sent as part of a data packet 216, which may include header information 535 that describes, for example, the size of the NR data 104, the size of the LTE data 106, the NR frequency range 536, the LTE frequency range 538, how to decode or demodulate the data packet 484, the NR data 104, and/or the LTE data 106 from the carrier signal 110, timing information, and the like. In this manner, the method 510 may coordinate frequency-divided data transmission at the base station 102 using multiple network communication standards over a frequency channel 200. While the method 510 uses the example of downlink transmissions from the base station 102 to the electronic devices 112, 116, the method 510 may also be applied to uplink transmissions.

The specific embodiments described above have been shown by way of example, and it should be understood that these embodiments may be susceptible to various modifications and alternative forms. Moreover, any of the specific embodiments (e.g., any process or decision blocks of a disclosed method) may be combined in whole or in part with any of the other specific embodiments (e.g., any other process or decision blocks of any other of the disclosed methods). It should be further understood that the claims are not intended to be limited to the particular forms disclosed,

The invention claimed is:

1. A first base station comprising:
   transmission circuitry configured to send first data at a first peak data rate of at least one gigabit per second on a frequency channel; and
   a control unit configured to:
   determine a first data size of the first data;
   determine a first time period to send the first data based on the first data size; and
   receive a second time period to send second data from a second base station at a second peak data rate of at least 20 gigabits per second on the frequency channel; and
   in response to determining that the frequency channel is clear of other transmissions:
   determine a first time to send the first data based on the first time period;
   determine a second time for the second base station to send the second data based on the first time period and the second time period;
   send an instruction to the second base station to send the second data on the frequency channel at the second time; and
   send the first data on the frequency channel at the first time using the transmission circuitry.

2. The first base station of claim 1, wherein the second base station is configured to determine a second data size of the second data, and determine the second time period to send the second data based on the second data size.

3. The first base station of claim 1, wherein the transmission circuitry is configured to send the first data according to an International Mobile Telecommunications-Advanced standard issued by an International Telecommunication Union Radiocommunication Sector.

4. The first base station of claim 1, wherein the second base station is configured to send the second data according to an International Mobile Telecommunications-2020 standard issued by an International Telecommunication Union Radiocommunication Sector.

5. The first base station of claim 1, wherein the frequency channel comprises a bandwidth of between 10 and 20 megahertz.

6. The first base station of claim 1, wherein the frequency channel is within an unlicensed spectrum of frequency.

7. The first base station of claim 1, wherein the first base station is communicatively coupled to the second base station via an Xn interface, and wherein the control unit is configured to send the instruction to the second base station to send the second data on the frequency channel at the second time via the Xn interface.

8. A base station comprising:
   transmission circuitry configured to send first data at a first peak data rate of less than 20 gigabits per second and second data at a second peak data rate of at least 20 gigabits per second on a frequency channel;
   a base station control unit configured to:
   determine that the frequency channel is clear of other transmissions;
   determine size of the first data and size of the second data;
   determine a first time period to send the first data based on the size of the first data and a second time period to send the second data based on the size of the second data;
   instruct the transmission circuitry to send the first data in the first time period on the frequency channel; and
   instruct the transmission circuitry to send the second data in the second time period on the frequency channel.

9. The base station of claim 8, wherein the transmission circuitry is configured to send the first data according to an International Mobile Telecommunications-Advanced standard issued by an International Telecommunication Union Radiocommunication Sector.

10. The base station of claim 8, wherein the transmission circuitry is configured to send the first data according to Institute of Electrical and Electronics Engineers 802.11 protocol standards.

11. The base station of claim 8, wherein the base station control unit is configured to send the first data and the second data on the frequency channel in a data packet.

12. The base station of claim 11, wherein the data packet fits within a channel occupancy window of the frequency channel.

13. The base station of claim 11, wherein the data packet comprises header information associated with the first data and the second data.

14. The base station of claim 8, wherein the second time period immediately follows the first time period.

15. The base station of claim 8, wherein a wireless communication device is configured to receive the first data and the second data on the frequency channel.

16. The base station of claim 8, wherein a first wireless communication device is configured to receive the first data and a second wireless communication device is configured to receive the second data on the frequency channel.

17. A communication device comprising:
   transmission circuitry configured to send first data at a first peak data rate of less than one gigabit per second and second data at a second peak data rate of at least 20 gigabits per second on a range of frequencies;
   a control unit configured to:
   determine size of the first data and size of the second data;
   determine a first transmission time interval to send the first data based on the size of the first data and a second transmission time interval to send the second data based on the size of the second data;
   determine that the range of frequencies is clear of other transmissions for a listening time interval; and
   instruct the transmission circuitry to send the first data in the first transmission time interval at the first peak data rate and the second data in the second transmission time interval at the second peak data rate on the range of frequencies.

18. The communication device of claim 17, wherein the first transmission time interval immediately follows the listening time interval, wherein the second transmission time interval immediately follows the first transmission time interval.

19. The communication device of claim 17, comprising receiving circuitry configured to receive third data on the range of frequencies, wherein the control unit is configured to determine size of the third data, determine a reception time interval to receive the third data based on the size of the third data, and instruct the receiving circuitry to receive the third data in the reception time interval on the range of frequencies.

20. The communication device of claim 19, wherein the first data is configured to be sent, the second data is configured to be sent, and the third data is configured to be received within a channel occupancy window of the range of frequencies.

\* \* \* \* \*